United States Patent
Kaddevarmuth et al.

(10) Patent No.: US 12,555,139 B2
(45) Date of Patent: *Feb. 17, 2026

(54) SYSTEMS AND METHODS OF PROVIDING ENHANCED CONTEXTUAL INTELLIGENT INFORMATION

(71) Applicant: Walmart Apollo, LLC, Bentonville, AR (US)

(72) Inventors: Srujana Kaddevarmuth, Cupertino, CA (US); Denila B. Philip, Leonia, NJ (US); Amlan J. Das, North Parganas (IN); Debanjana Banerjee, Kolkata (IN); Apurva Sinha, Fremont, CA (US); Abin Abraham, Bangalore (IN); Mark A. Hardy, Warren, NJ (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/949,889

(22) Filed: Nov. 15, 2024

(65) Prior Publication Data

US 2025/0078117 A1 Mar. 6, 2025

Related U.S. Application Data

(63) Continuation of application No. 17/540,101, filed on Dec. 1, 2021, now Pat. No. 12,148,003.

(51) Int. Cl.
*G06Q 30/0251* (2023.01)
*G06F 8/41* (2018.01)
(Continued)

(52) U.S. Cl.
CPC .......... *G06Q 30/0256* (2013.01); *G06F 8/43* (2013.01); *G06F 21/6263* (2013.01); *G06Q 30/0242* (2013.01)

(58) Field of Classification Search
CPC ...................................................... G06Q 30/02
(Continued)

(56) References Cited

U.S. PATENT DOCUMENTS 10,706,450 B1 * 7/2020 Tavernier ........... G06Q 30/0641
12,148,003 B2    11/2024 Kaddevarmuth
(Continued)

OTHER PUBLICATIONS

Dillon, Grace; "Contextual Advertising: AI's Answer to a Cookieless World"; ExchangeWire; Jul. 21, 2021; www.exchangewire.com/author/grace/; 14 pages.
(Continued)

*Primary Examiner* — Afaf Osman Bilal Ahmed
(74) *Attorney, Agent, or Firm* — Fitch, Even, Tabin & Flannery LLP

(57) ABSTRACT

Some embodiments provide systems to determine contextual information comprising: an intent mining system that receive inquiry content that does not include personal identification information (PII) and is configured to determine an estimated intent information being sought by an intended recipient, identify a mapping to a sub-set of supplemental keywords corresponding to the intent information; and identify historic inquiries associated with actual historic product purchases relevant to the inquiry content and supplemental keywords, and obtain a listing of products associated with the inquiry content; a product association system that identifies a set of multiple products that each have a purchase threshold relationship with one or more products from the determined listing of products, and generate an enhanced listing of products; a topic extraction system that evaluates associations between product parameters of the enhanced listing of products to identify multiple associated topics and corresponding topic confidence scores.

20 Claims, 9 Drawing Sheets

(51) Int. Cl.
*G06F 21/62* (2013.01)
*G06Q 30/0242* (2023.01)

(58) Field of Classification Search
USPC ..................................................... 705/14.01
See application file for complete search history.

(56) References Cited

U.S. PATENT DOCUMENTS

| | | |
|---|---|---|
| 2014/0280016 A1 | 9/2014 | Williams |
| 2015/0262255 A1 | 9/2015 | Khajehnouri |
| 2016/0055563 A1 | 2/2016 | Grandhi |
| 2018/0225712 A1 | 8/2018 | Larner |
| 2018/0232662 A1* | 8/2018 | Solomon .................. G06F 3/011 |
| 2023/0169540 A1 | 6/2023 | Kaddevarmuth |
| 2023/0315999 A1 | 10/2023 | Mohammed |
| 2024/0249318 A1* | 7/2024 | Spiegel .................. H04L 51/02 |

OTHER PUBLICATIONS

Dreller, Josh; "Personalize Ads Websites in Real Time With Consumer Search Terms"; Signal; Jul. 21, 2014; 8 pages.

USPTO; U.S. Appl. No. 17/540,101; Final Rejection mailed Mar. 5, 2024; (15 pages).

USPTO; U.S. Appl. No. 17/540,101; Non-Final Rejection mailed Jul. 18, 2023; (6 pages).

USPTO; U.S. Appl. No. 17/540,101; Notice of Allowance and Fees Due (PTOL-85) mailed Jul. 17, 2024; (8 pages).

* cited by examiner

SYSTEMS AND METHODS OF PROVIDING ENHANCED CONTEXTUAL INTELLIGENT INFORMATION

CROSS-REFERENCE TO RELATED APPLICATIONS

This application is a continuation of U.S. application Ser. No. 17/540,101 filed Dec. 1, 2021, which is incorporated herein by reference in its entirety.

TECHNICAL FIELD

This invention relates generally to providing identifying contextually relevant information.

BACKGROUND

Content sources typically prefer to have information about an intended recipient in identifying which content to supply. The content provided, however, typically has less relevance when information about the intended recipient is not available or limited.

BRIEF DESCRIPTION OF DRAWINGS

Disclosed herein are embodiments of systems, apparatuses and methods pertaining to providing contextual intelligent information and the use of the contextual intelligent information in identifying relevant content. This description includes drawings, wherein.

Figure 1:
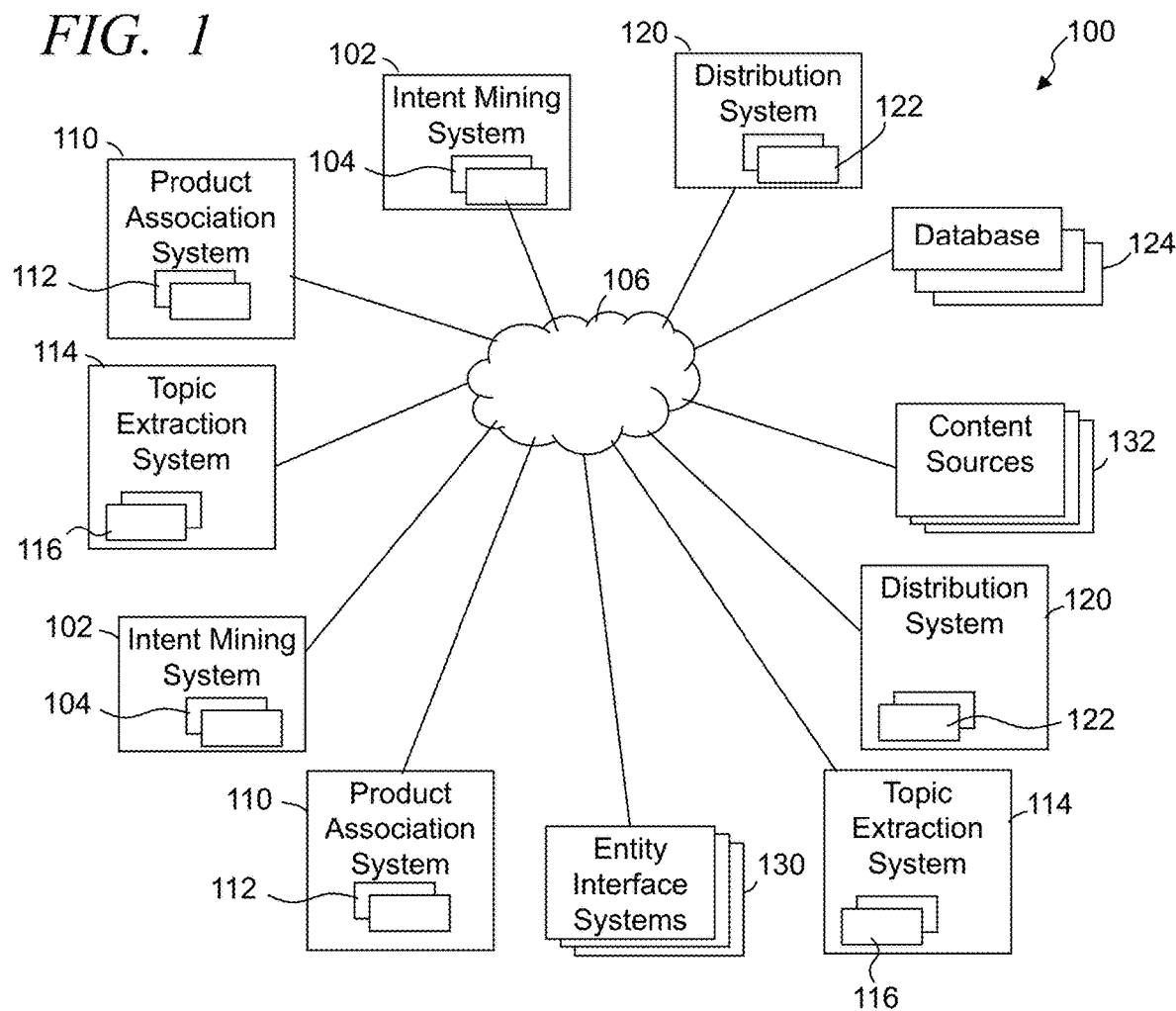
FIG. 1 illustrates a simplified block diagram of an exemplary enhanced content system configured to provide contextual intelligent information, in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

The following description is not to be taken in a limiting sense, but is made merely for the purpose of describing the general principles of exemplary embodiments. Reference throughout this specification to "one embodiment," "an embodiment," "some embodiments", "an implementation", "some implementations", "some applications", or similar language means that a particular feature, structure, or characteristic described in connection with the embodiment is included in at least one embodiment of the present invention. Thus, appearances of the phrases "in one embodiment," "in an embodiment," "in some embodiments", "in some implementations", and similar language throughout this specification may, but do not necessarily, all refer to the same embodiment.

The present embodiments are directed to the network-centric and/or Internetcentric problems associated with a decrease in information available as a result of restrictions on the acquisition and use of personal information, personal identification information (PII), personal network cookie data, browser behaviors, and other information that may be restricted. In absence of network and/or third party cookies, PII information and other such information that provides insights into content recipients' behaviors, the identification of information that is most relevant to a particular intended recipient is extensively hampered. The use of such PII and network information has been available for years to provide content that is more relevant to a requesting entity. Existing targeted content supply systems are typically based on collecting and analyzing users' browsing behaviors and first party information, which provides insights into their perceived interests, habits, future actions, buying behaviors, and the like. Because of restrictions, regulations, laws and policies, however, such information is expected to no longer be available for use or extensively limited. As such, systems are greatly limited or unable to identify information that is more relevant to an intended recipient.

Alternatively, however, present embodiments address this networkcentric problem through detailed analysis of information through correlation with other requests for information. Some embodiments further take advantage of historic information associated with historic requests for information while not using such personal information, personal identification information (PII), and other network information (e.g., cookie data, a requestor's browser behavior). More specifically, some embodiments access data sources of information that associate inquiry content information with subsequent content access and/or actual purchases of products in relation to those content inquiries.

Generally speaking, pursuant to various embodiments, systems, apparatuses and methods are provided herein useful in providing enhanced, more relevant contextual information. Some of these systems comprise: an intent mining system comprising mining evaluation processors communicatively coupled over a distributed communication network. One or more of the intent mining processors are configured to cooperatively operate to receive inquiry content associated with different intended recipients and that does not include personal identification information (PII) of the intended recipients and does not include personal network cookie data associated with the intended recipients, and for each inquiry content associated with a respective one of the intended recipients the mining evaluation processors are configured to: determine an estimated intent information being sought by the respective intended recipient based on associations with the inquiry content, and identify based on the intent information a mapping to a sub-set of supplemental keywords corresponding to the intent information and having a threshold relationship with the inquiry content; and identify historic inquiries that are associated with actual historic product purchases and that have threshold relationships with the inquiry content and the sub-set of supplemental keywords, wherein the historic content inquiries do not include PII or personal network cookies, and identify product purchases made following the respective historic inquiry, and obtain a listing of products associated with the inquiry content and that were historically purchased in relation to historic content inquiries.

Further, some systems include a product association system comprising one or more association processors configured to, for each inquiry content: evaluate retail product association data and identify a set of multiple products that each have a purchase threshold relationship with one or more products from the determined listing of products, and generate an enhanced listing of products comprising the listing of products and the set of multiple products. Some embodiments include a topic extraction system comprising one or more topic extraction processors configured to: evaluate associations between product parameters of the products of the enhanced listing of products to identify multiple associated topics that are estimated to be relevant to the inquiry content, and determine for each topic a topic confidence score defining an estimated relevance the respective topic has to the respective inquiry content based on levels of association between the product parameters of the enhanced listing of products. Additionally, as introduced above, these topics are determined without the use of PII, personal information and other such information. In some embodiments, the system further comprises a distribution system comprising one or more distribution processors configured to: communicate, over an external computer network, the topics to target content sources to be used by one or more of the respective content sources in determining a valuation in supplying to the first intended recipient enhanced contextually relevant content associated with the respective content source and relevant to the inquiry content associated with the first intended recipient.

In some embodiments, methods provide contextual information that enable access to enhanced contextual information comprising: receiving multiple different inquiry content that are each associated with different intended recipients, wherein the inquiry content does not include personal identification information (PII) of the intended recipients and does not include personal network cookie data associated with the intended recipients, and for each inquiry content associated with a respective one of the intended recipients: determining an estimated intent information being sought by the respective intended recipient based on associations with the inquiry content, identifying based on the intent information a mapping to a sub-set of supplemental keywords corresponding to the intent information and having a threshold relationship with the inquiry content; and identifying historic inquiries that are associated with actual historic product purchases and that have threshold relationships with the inquiry content and the sub-set of supplemental keywords, wherein the historic content inquiries do not include PII or personal network cookies, and identify product purchases made following the respective historic inquiry; obtaining a listing of products associated with the inquiry content and that were historically purchased in relation to historic content inquiries; evaluating retail product sales association data and identifying a set of multiple products that each have a purchase threshold relationship with one or more products from the determined listing of products; generating an enhanced listing of products comprising the listing of products and the set of multiple products; evaluating associations between product parameters of the products of the enhanced listing of products; identifying multiple associated topics that are estimated to be relevant to the inquiry content; and determining for each topic a topic confidence score defining an estimated relevance the respective topic is to the respective inquiry content based on levels of association between the product parameters of the enhanced listing of products; and communicating, over an external computer network, the topics to target content sources to be used by one or more of the respective content sources in determining a valuation in supplying to the first intended recipient enhanced contextually relevant content associated with the respective content source and relevant to the inquiry content associated with the first intended recipient.

FIG. 1 illustrates a simplified block diagram of an exemplary enhanced content system 100 configured to provide contextual intelligent information that can be used to provide more relevant and enhanced contextual information to intended recipients requesting information (e.g., individuals, companies, organizations, and/or substantially any relevant entity attempting to acquire relevant content), in accordance with some embodiments. Accordingly, the enhanced content system 100 is configured to receive content inquiries and/or requests from multiple different intended recipient entities through respective entity interface systems 130 (e.g., computers, smartphones, tablets, laptops, other portable devices, servers, and/or substantially any other relevant entity systems). The inquiry contents can be in the form of one or more words, one or more phrases, one or more sentences, one or more alphanumeric characters, one or more images, one or more symbols, one or more sounds and/or audio data, other such types and/or formats of inquiry content, or a combination of two or more of such types and/or formats.

In some embodiments, the content system 100 further includes one or more intent mining systems 102 that are coupled with one or more distributed communication and/or computer networks 106 (e.g., the Internet, local area network (LAN), wide area network (WAN), cellular network, Wi-Fi, other such communication networks enabling wired and/or wireless communication, or a combination of two or more of such networks). Typically, the intent mining system 102 comprises one or more mining evaluation processors 104 configured to process content inquiries received from intended recipients through respective entity interface systems 130, and determine a content intent of the requesting intended recipient based on an evaluation of the inquiry content (e.g., terms, images, sounds, etc.). The content system 100 further includes, in some implementations, one or more product association systems 110 communicatively coupled with the distributed network 106 and that utilize the determined intentions of the content recipients to identify relevant products and/or other such information that is associated with the respective inquiry content. Typically, the one or more product association systems 110 comprise one or more association processors 112.

Further, the content system 100, in some embodiments, includes one or more topic extraction systems 114 communicatively coupled with the distributed network 106, and typically are implemented through one or more topic extraction processors 116. The content system 100, in some implementations, includes one or more distribution systems 120 configured to distribute information, such as but not limited to topic information. One or more computer storage systems 124 (e.g., databases, computer memory, server memory, processor memory, etc.) is further included in the content system 100. Some or all of the storage systems, in some embodiments, is incorporated as part of one or more of the one or more intent mining systems 102, the one or more product association systems 110, the one or more topic extraction systems 114, separate storage systems, or a combination of two or more of such storage systems communicatively coupled with the one or more communication networks 106.

As introduced above, the enhanced content system 100 is configured to receive content inquiries for content and to obtain enhanced content that is relevant to the inquiry content and the intended recipient without the benefit of restricted information (e.g., without personal information, PII, personal network cookie data, limits on availability of metadata, restrictions of the availability of mobile identification information, number of persistent signals available for targeted content, and/or other such information that may be restricted based on one or more factors, such as but not limited to one or more of laws, regulations, user settings, user preferences, company policies, other such factors or a combination of two or more of such factors). Previous systems were able to utilize such restricted information to identify and/or track information that allowed the more relevant information to be identified and utilized in identifying content that is likely to be more relevant to that requesting entity. In absence of such restricted information, these previous systems and other systems typically cannot capture complex propensities and/or relevance factors that can be used to facilitate the identification of content that is more relevant to the intended content recipients. Unlike cookies and device identifiers, contextual signals by themselves typically cannot provide sufficient information about an intended content recipient to identify information that is more relevant to that particular intended recipient.

The enhanced content system 100, in part, takes advantage of historical content inquiries from other unassociated requesting entities, as well as historical actions taken in response to content supplied to these unassociated requesting entities, without the use of restricted information (e.g., personal information, PII, personal network cookie data and/or other such information). In some embodiments, one or more knowledge graphs, product databases, historic purchase information, other such information, and typically a combination of such information accessible through the one or more storage systems 124, enable the content system to determine accurate behavioral signals to enhance contextual targeting by content sources 132 and/or providers. Accordingly, the content sources 132 are cable of identify when content that is more relevant to a particular intended recipient and/or distinguish which content is more relevant to a particular intended recipient. For example, some embodiments take advantage of purchase patterns identified through tracking activities through an omni transaction historic previous purchase data system of content through one or more retail entities without the use of the restricted information relative to corresponding historic inquiry content to provide enhanced contextual signals to capture near real-time content trends and identify content more relevant to an intended recipient. In some embodiments, the content system 100 provides a multi-staged process that accurately maps content signals to complex browse patterns and cross-product association, that enables the relevant product space that can be potentially driven by related content. This augments the current content signals with a more relevant class of behavioral signals by accurately mining intent, cross-product product purchase propensity, and/or other such cross-content propensities.

Figure 2:
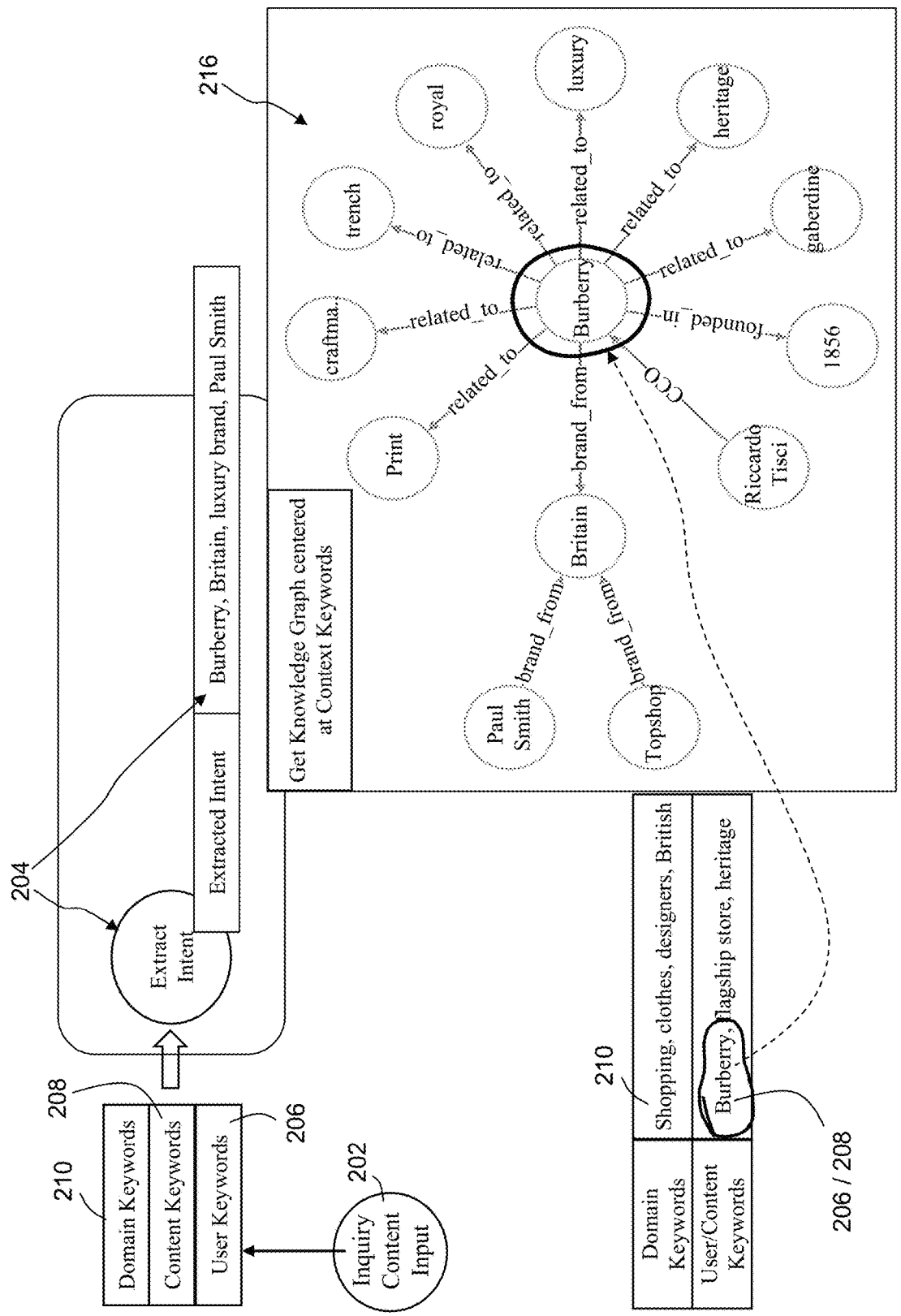
FIG. 2 provides a simplified block diagram illustrating an exemplary process to identify an intent of inquiry content, in accordance with some embodiments.

In some embodiments, the intent mining system 102 is coupled over the distributed communication network 106 and configured to receive inquiry content associated with different intended recipients from different entity interface systems 130. FIG. 2 provides a simplified block diagram illustrating an exemplary process to identify an intent of inquiry content, in accordance with some embodiments. Referring to FIGS. 1 and 2, as described above, the inquiry contents 202 typically does not include PII of the intended recipients, does not include personal network cookie data associated with the intended recipients and/or other such restricted information. For each request and/or inquiry content 202 input, one or more of the mining evaluation processors determine an estimated intent information 204 being sought by the respective intended recipient based on associations with the inquiry content. The inquiry content 202 can include requestor search terms or keywords 206, phrases, sounds, images, symbols and other such information supplied by a requesting entity.

Further, in some embodiments, the inquiry content 202 may be through a particular website and/or service. Accordingly, the inquiry content in some applications can include domain information 210 from the website and/or service and/or relevance information supplied by the website and/or service. In some embodiments, the mining evaluation processors acquire intended recipient non-private information about the respective intended recipient as a function of a network connection and timing information corresponding to when the respective inquiry content is requested. For example, the website from which the inquiry content is received may be associated with an activity or an interest (e.g., camping, bicycling, sailing, snow skiing, shopping, clothes, shoes, cars, travel, restaurants, news, books, movies, etc.), geographic location, time zone, and/or other information. Accordingly, such information (e.g., links, content keywords 208, images, etc.) that is not specific to the intended recipient can be provided as the inquiry content or as part of the inquiry content (e.g., provided in supplement to one or more requestor keywords 206, content keywords 208, and/or other such information). For example, a site may be a blog about British clothes that is accessed by an individual, and at least some of the inquiry content 202 can be provided by the server or website. Such inquiry content can include domain keywords 210 (e.g., shopping, clothes, designer, British, blog, etc.). Some embodiments may additionally or alternatively obtain content keywords 208 (e.g., Burberry, flagship store, heritage, etc.) provided by the website and/or the individual accessing the content of the website or other content source. Still further, in some applications, the server and/or website may provide determined information that is not personal to the individual based on the individuals actions (e.g., estimated age or date of birth of individual, estimated gender, etc.).

Still further, inquiry content may include geographic information based on information within the content being accessed (e.g., the blog may be discussing a particular store in Great Britain, current country and/or state from which the server is accessed, etc.), time information may be obtained (e.g., time of year and/or season when the content is being accesses, time of year and/or season in which the content being accesses is associated (e.g., winter when accessing information about skiing), etc.), type of entity interface system 130 being used by the individual (e.g., IPHONE, IPAD, DELL laptop, etc.), and/or other relevant non-private information.

In some embodiments, the one or more intent mining systems 102 and/or processors 104 include and/or implement one or more keyword association systems and/or engines to access one or more terms mapping information and/or databases (e.g., one or more knowledge graphs, one or more mapping trees, and/or other relevant information) that maps 216 associations between terms and/or other relevant inquiry content 202. Based on the mapping between terms, a sub-set of enhanced and/or supplemental keywords 218 associated with the intent information and having a threshold relationship with the inquiry content is determined. The supplemental keywords may be individual words, phases, products, activities, etc. that are mapped 216 based on one or more factors, such as determined relationships based on historic information, linked by a content or product supplier, linked based on multiple previous searches, related sources of content, related products, related subjects of content, other such linking, or a combination of two or more of such associations. Some embodiments, for example, access one or more knowledge graphs and using the intent information (e.g., key words) identifies other supplemental keywords that are directly associated with the intent and provide additional scope and/or relevance to the determined intent. In some embodiments the knowledge graph and/or other relevant mapping information can additionally map or link terms and/or information with a context with which the term is associated. For example, a term such as apricot in one or more instances may be associated with the fruit as context, while one or more other instances of the term apricot is associated with a clothes brand as context, while still one or more other instances of apricot correspond to other context (e.g., make-up, color, etc.). Such context information is further used to identify associated terms while excluding other associations.

In some embodiments, the intent mining system 102 is further configured to evaluate one or more product data storage systems 124 (e.g., databases, knowledge graphs, knowledge trees, etc.) utilizing the intent information 204, which in some instances includes the sub-set of supplemental keywords 218, to identify retail products that have been and/or are currently offered for sale by one or more retail entities.

Figure 3:
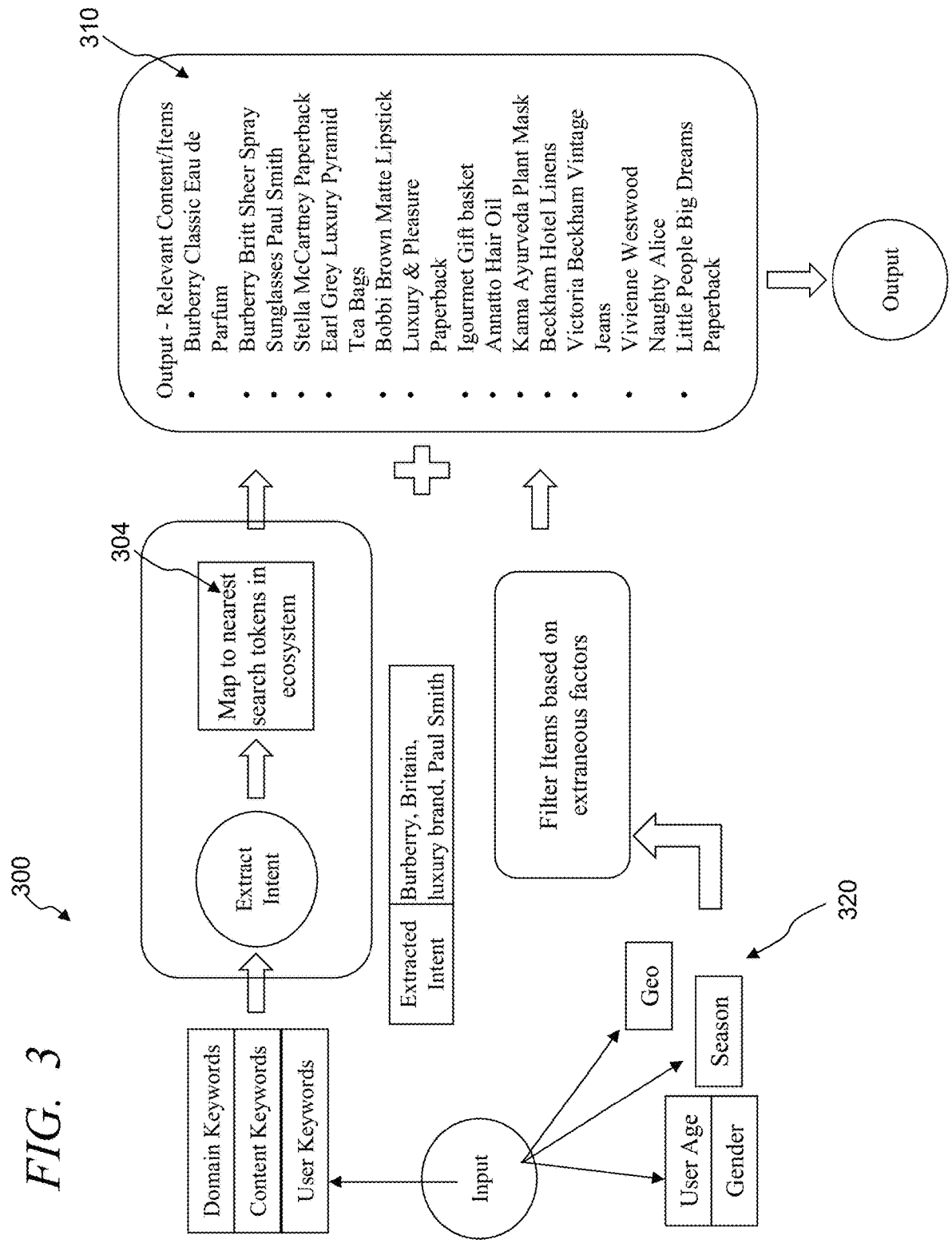
FIG. 3 shows a simplified block diagram illustrating an exemplary process that uses an intent of inquiry content to identify a set of products associated with the intent, in accordance with some embodiments.

FIG. 3 shows a simplified block diagram illustrating an exemplary process 300 that uses an intent of inquiry content to identify a set of products associated with the intent, in accordance with some embodiments. Referring to FIGS. 1-3, some embodiments further access product storage systems 124 that maintain product mappings (e.g., in databases, knowledge graphs, knowledge trees, and/or other associations) between historic searches and/or terms and retail products sold and/or added to a cart in association with a respective historic search and/or terms. Some embodiments identify historic inquiries that are associated with actual historic product purchases and that have threshold relationships with the intent and/or inquiry content and the sub-set of supplemental keywords. Again, the historic content inquiries typically do not include PII, network cookies, etc. The mapping associates searches and/or terms with one or more identify product purchases made following the respective historic inquiry. Based on the mapping the intent mining system 102 is configured to obtain a listing of products 310 that are associated with the intent, and thus inquiry content and that were historically purchased in relation to historic searches and/or content inquiries. In some embodiments, the intent mining system accesses mappings 304 between products of an ecosystem and nearest search tokens corresponding to the intent, the supplemental keywords and/or the inquiry content.

Some embodiments further attempt to focus or limit the listing of products 310 identified by applying a set of one or more relevance filters 320 and/or filter parameters. At least some of such filters can be based on non-private information acquired that are relevant to the inquiry content and/or intended recipient. In some embodiments, the mining evaluation processors 104 acquire intended recipient non-private information about the respective intended recipient as a function of a network connection, timing information corresponding to when the respective inquiry content is requested, website information, server information, and/or other relevant information that is capable of use in filtering. Such non-private information can include, but is not limited to, geographic location information 320 of the intended recipient and/or the computing device 130 used by the intended recipient (e.g., based on network connection, network address, etc.), time of year or season when the inquiry is received, a holiday associated with and/or within a threshold of the time when the inquiry is received, estimated age of intended recipient (e.g., based on a site and/or content being viewed in association with the inquiry, based on the inquiry content, etc.), an estimated gender association of the intended recipient (e.g., based on a site and/or content being viewed in association with the inquiry, based on the inquiry content, etc.), and/or other such information that does not include PII, intended recipient search history information, and/or other such information. The intent mining system can apply a set of one or more relevance filters, based on the recipient non-private information and the timing information, to exclude from the from the listing of products 310 a subset of the actual historic product purchased that have the association with historic inquiries.

In some embodiments, the content system 100 further utilizes one or more of the product association systems 110 to determine an enhanced listing of products based on, at least in part, associations between each of the products of the listing of products 310 and one or more additional products. The one or more association processors, in some implementations, are configured to evaluate, for each inquiry content, retail product associations that define linkings and/or associations between product sets of two or more products that historically have been purchased together or purchased within a threshold period of time or other such association. In some embodiments, the product association further defines an estimated likelihood that the set of two or more products are predicted to be purchased together. Still further, in some implementations, the relevance or likelihood of purchasing the set of products is further related to historic inquiry content and/or determined intents associated with the historic inquiry content. The evaluation of purchases typically further evaluates the associations in relationship to one or more thresholds.

One or more of the product association systems 110, in some embodiments, evaluate historic retail product sales association data from one or more retail entities, and identify one or more sets of multiple products that each have a purchase threshold relationship with one or more products from the determined listing of products. That is, the one or more product association systems 110 identify sets of products that have repeatedly been purchased together, purchased within a threshold period of time and/or are otherwise associated through actual purchases. In some embodiments, the association processors, in identifying the set of multiple products, identifies one or more products purchased a threshold number of times with a respective one of the associated products. The purchase threshold relationship can be a set number of purchases of the multiple products together or within a threshold period of time, can be defined as a function of a number of sets of multiple products identified (e.g., limit to a certain number of sets of multiple products (e.g., 10 most frequently purchased sets), can be dependent on the number of sets of multiple products purchases identified, can be dependent on a frequency of purchases of such identified sets, can be dependent on a number of products within a set, can be dependent on the number of products within the listing of products, can be determined by one or more product association machine learning models previously trained according to a corpus of historic purchases and/or other relevant transactions, other such factors, or a combination of such factors. Based on the identified sets of multiple products, the product association systems 110 generate an enhanced listing of products comprising the listing of products and one or more products from one or more of the sets of the multiple products identified that have the threshold purchase relationship, and in some instances all of the products of the sets of the multiple products identified that have the threshold purchase relationship with one or more of the products from the listing of product. The listing may identify products based on one or more identifiers, product names, product numbers, UPC numbers, barcode numbers, other such identifying information or a combination of two or more of such information. In some embodiments, the purchase history information includes retail store purchase information, e-commerce purchase information, products put into layaway, products added to a virtual e-commerce shopping cart, and/or other types of sales and/or expected sales.

Some embodiments improve the performance and reduce computational processing, reducing memory requirements, reducing operational overhead, and improve response time of at least the one or more of the product association systems 110 by not evaluating some combinations of products based on an identification that a sub-set of two or more products of the combination of products does not satisfy one or more threshold purchase relationships. For example, upon identifying that a set of product "A" and Product "B" (AB) does not satisfy one or more threshold purchase relationships, the system improves performance in part by not evaluating supersets of multiple products that include the subset of products AB (e.g., supersets of ABC, ABD, ABE . . . , ABCD, ABCE, ABCF, . . . and other supersets that include the subset of A and B are not evaluated based on the subset of products AB not satisfying the one or more of the threshold purchase relationships.

One or more of the topic extraction systems 114, in some embodiments, determine one or more topics associated with the inquiry content based on relationships between products of the enhanced listing of product. In some embodiments, the one or more topic extraction systems 114 access information about the products of the enhanced listing of products in relation to product parameter information and evaluates associations between product parameters associated with the different products of the enhanced listing of products to identify the associated topics that are estimated to be particularly relevant to the inquiry content 202. The product parameters can include substantially any relevant product information about the respective products, the expected uses of the products, the potential uses of the products, potential combinations with other products when used and/or consumed, relationships with other products, other such information, and typically a combination of two or more of such information. Examples of some topics may include but are not limited to one or more of: product types (e.g., cereal, coffee, tea, pants, perfume, shoes, luxury goods, British products, balls, sports equipment, tennis equipment, tools, plumbing, cars, music, pianos, string instruments, etc.), brands, trends, product source, product origin, organic, environmentally friendly, color, style, size, dimensions, weight, intended uses, alternative uses, summer, winter, night, breakfast, and other such topics. The above examples are merely some examples of potential topics and is not a complete list. In some implementations, one or more of the topic extraction systems 114 applies one or more topic machine learning models or engines, which is trained based on one or more product parameter corpuses, to identify the one or more topics corresponding to the identified enhanced listing of products. For example, one or more brand topic modeling applied to identify brands, one or more types topic modelings to identify product types, one or more use topic modelings to identify associations between product uses, other topic modelings to identify other aspects of products and/or their associations, or a combination of two or more of such modelings to identify one or more topics that are highly relevant to the inquiry content 202.

In some implementations, one or more of the topic extraction systems 114 further determine for each topic a topic confidence score defining an estimated relevance the respective topic has to the respective inquiry content 202. In some implementations, the topic confidence score is determine based on levels of association between the product parameters of the enhanced listing of products (e.g., a level of aligned, the number of corresponding product parameters, level of being purchased together, a level of being used together, etc.). Again, some embodiments additionally or alternatively utilize one or more topic machine learning models to determine the topic confidence stores of the identified topics relative to the respective inquiry content 202.

Some embodiments further utilize the identified topics corresponding to the inquiry content to determine an estimated relevance and/or value, with respect to the particular intended recipient, associated with additional enhanced content and/or information that can potentially be supplied to the intended recipient associated with the respective initial inquiry content, and/or whether such additional content should be supplied to the intended recipient. Often entities desire to distribute content that is more relevant and/or is more likely to be considered and/or acted upon by individuals and/or other entities that receive that content. The more likely a potential individual and/or entity is to actually consider and/or act based on additional content supplied, typically, the more value there is in supplying that relevant additional content to that particular individual and/or entity, compared to one or more other individuals or entities that are unlikely to consider the additional content. Accordingly, in some embodiments, the enhanced content system 100 further utilizes the determined topics, and corresponding topic confidence score when available, to identify enhanced additional content that is highly relevant to the intended recipient and/or in determining a value in supplying one or more additional enhanced content to a particular intended recipient associated with a particular inquiry content from which the topics are determined. Additionally or alternatively, in some implementations, the content system 100 may distribute the determined topics and topic confidence scores to one or more other entities that have additional content that they would like to distribute to potential recipients. These one or more other entities can utilize the topics and topic confidence scores relative to the particular additional content to determine whether to and/or a value in distributing that particular additional content to that particular intended recipient.

In some embodiments, the enhanced content system 100 includes one or more distribution systems 120, which typically are implemented through one or more distribution processors 122. The distribution system 120 can be controlled by one or more central control circuits or systems to communicate, over an external computer network, the topics to target content sources 132 to be used by one or more of the respective target content sources 132 in determining a valuation in supplying to an particular intended recipient enhanced contextually relevant content that is associated with the respective target content source 132 and that is relevant to the inquiry content associated with the intended recipient. The valuation can be based on multiple different factors including but not limited to the type of enhanced contextually relevant content, the information communicated through the enhanced contextually relevant content, expectations of one or more actions by the intended recipient based on the enhanced contextually relevant content, other such factors, and typically a combination of two or more of such factors.

As one non-limiting example, a target content source 132 may have news articles that it intends to distribute, and can determine a value associated with distributing a particular one of those news articles to the intended recipient based on the topics and the respective topic confidence scores. As another non-limiting example, a source of a product may receive one or more of the determined topics and the respective topic confidence scores, and can determine a value associated with having enhanced contextually relevant advertising content regarding the product distributed to that particular intended recipient, and can take one or more actions based on the determined valuation associated with distributing that particular enhanced contextually relevant advertising content to that particular intended recipient. In yet another non-limiting example, a source of a social media content can receive one or more of the determined topics and the respective topic confidence scores, and can determine a value associated with having enhanced contextually relevant social media content distributed to that particular intended recipient, and can take one or more actions based on the determined valuation. The determination of value in targeted distribution of content based on the determined topics and/or topic confidence scores can be used by substantially any potential target content source 132

Figure 4:
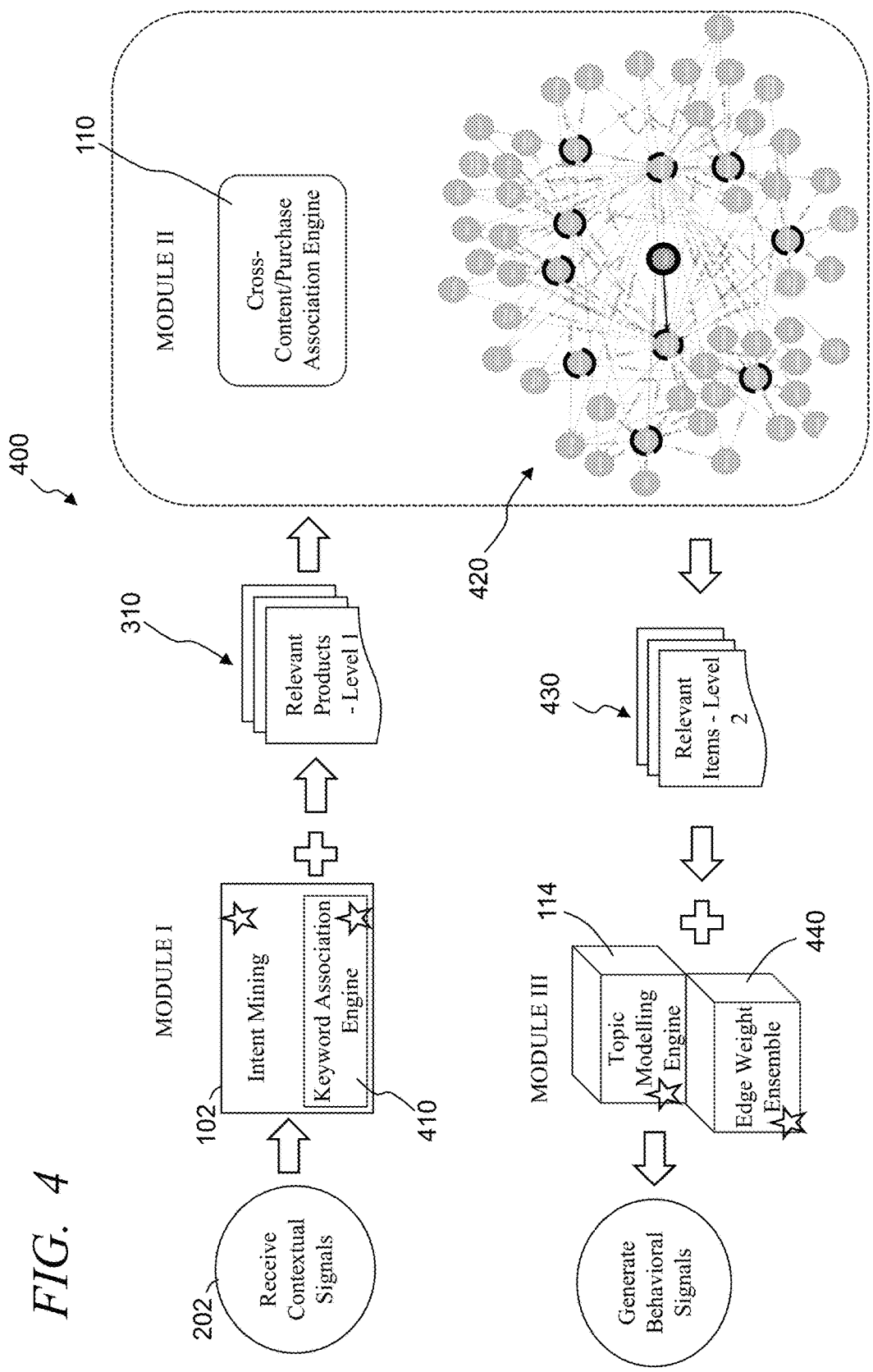
FIG. 4 illustrates a simplified block diagram of an exemplary process of identifying content related topics and topic confidence scores, in accordance with some embodiments.

FIG. 4 illustrates a simplified block diagram of an exemplary process 400 of identifying content related topics and topic confidence scores, in accordance with some embodiments. Referring to FIGS. 1-4, one or more of the intent mining systems 102 receives and/or extracts the initial inquiry content 202 from a potential intended recipient of enhanced contextually relevant content. The intent mining system 102 determines based on the inquiry content one or more intentions of the potential recipient. As described above, the inquiry content 202 may be supplied by the potential intended recipient, provided by an interface system 130 used by the intended recipient, provided by a browser application or other application used by the interface system 130, provided by a source of initial content being accessed by the intended recipient, and/or other sources of the inquiry content.

Typically, the intent mining system 102 further includes and/or implements one or more keyword association systems 410 that use the determined intent of the intended recipient and/or the inquiry content to identify or determine a sub-set of supplemental keywords 218 that are associated with the determined one or more intentions and/or having a threshold relationship with the inquiry content. In some embodiments term mappings 216 (e.g., knowledge graphs, tables of terms, one or more matrices of associations of terms, and/or other such information) are accessed to identify supplemental keywords. The supplemental keywords, in some embodiments, include terms, phrases, images and/or other historic inquiry content from one or more previous inquiry content and/or product searches associated with one or more retail entities.

The intent mining system 102, in some implementations, further evaluates historic product information and/or product sales information to identify products 310 that have a threshold relationship with one or more of the intent, supplemental keywords and/or inquiry content. Further, the products considered may be limited to products that were actually sold or placed into a virtual cart in relation to product search. In some embodiments, the intent mining system accesses mappings between products of an ecosystem and nearest search tokens corresponding to the intent, the supplemental keywords and/or the inquiry content identify a listing of products 310 relevant to the intent and inquiry content.

One or more of cross-content product association systems 110 utilize the identified listing of products 310 to determine an enhanced listing of products 430 based on, at least in part, associations 420 between each of the products of the listing of products 310 and one or more additional products.

Some embodiments further implement one or more of the topic extraction systems 114 to determine one or more topics associated with the inquiry content based on relationships between products of the enhanced listing of product 430. In some embodiments, the one or more topic extraction systems 114 access information about the products of the enhanced listing of products 310 in relation to product parameter information and evaluates associations between product parameters associated with the different products of the enhanced listing of products to identify the associated topics that are estimated to be particularly relevant to the inquiry content 202. In some implementations, one or more of the topic extraction systems 114 includes and/or cooperates with a confidence system 440 that determines for each topic a topic confidence score defining an estimated relevance the respective topic has to the respective inquiry content 202. The determined topics and the respective topic confidence scores can be used to identify enhanced contextually relevant content that may be provided to the intended recipient. In some implementations, the determined topics and the respective topic confidence scores are communicated to one or more other content source systems and/or third party content source entities that evaluate the topics and topic confidence scores relative to particular additional content that the entities desire to distribute, and determine a value of distributing that particular additional content to that particular intended recipient. This allows enhanced contextually relevant content that has a determined value to the content source (e.g., value is greater than a threshold value) to be directed to the intended recipient.

Figure 5:
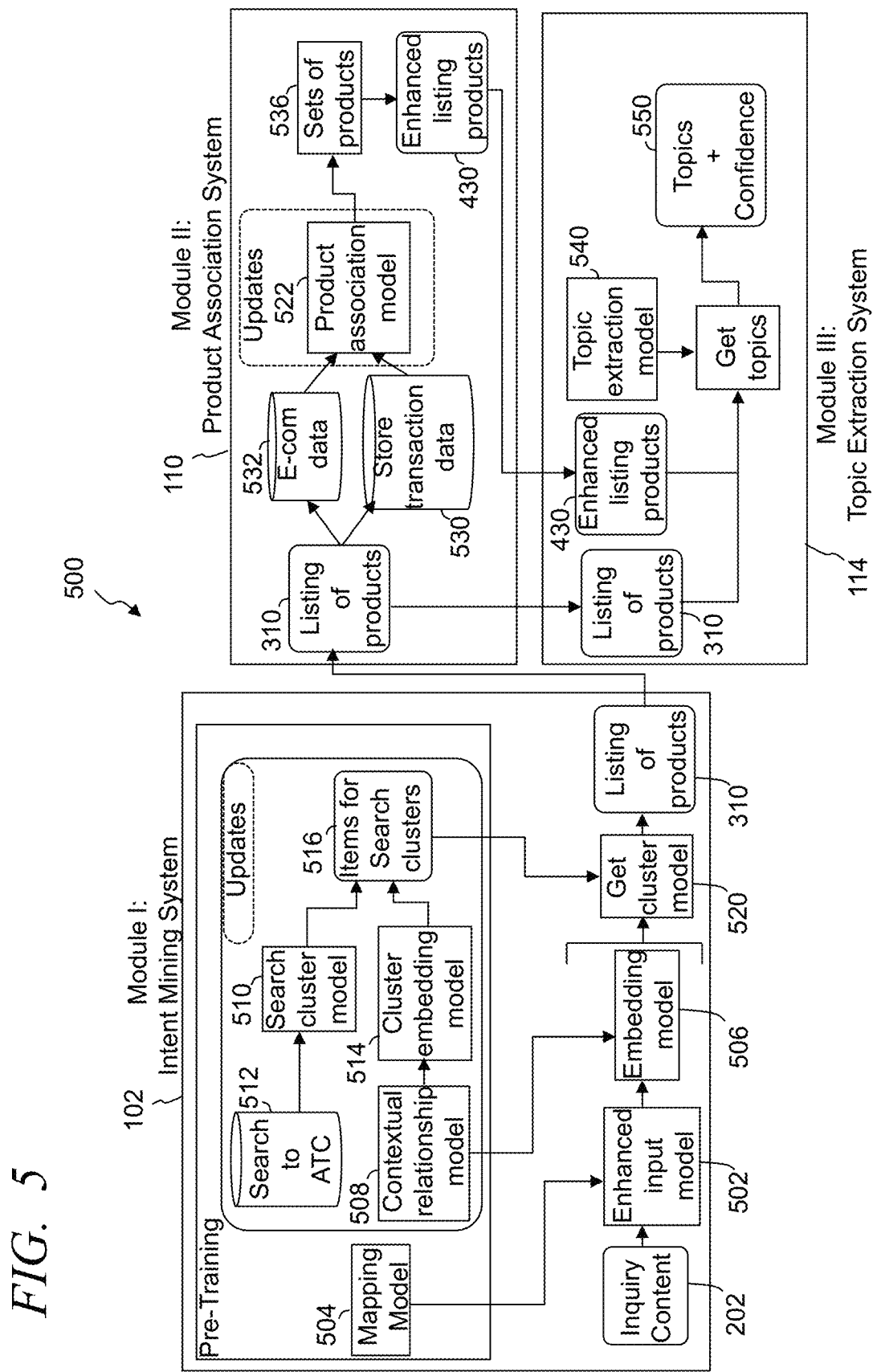
FIG. 5 illustrates a simplified block diagram of an exemplary enhanced content system, in accordance with some embodiments.

FIG. 5 illustrates a simplified block diagram of an exemplary enhanced content system 500, in accordance with some embodiments, that includes one or more intent mining systems 102, one or more of the product association systems 110, and one or more topic extraction systems 114. In some embodiments, one or more of the intent mining systems 102, the product association systems 110, and the topic extraction systems 114 apply one or more machine learning models that are executed by one or more of the respective mining evaluation processors 104, association processors 112 and/or topic extraction processors 116. Further, in some instances one or more of the applied machine learning models are utilized in real-time in response to receiving the inquiry content, while one or more of the machine learning models are pre-trained and pre-run, and typically periodically retrained and re-run periodically (e.g., daily, weekly, monthly, etc.) or based on some schedule to provide relevant information that can be utilized in real-time. This can greatly reduce the computational overhead of the enhanced content system 500, while effectively improving response time in providing real-time results that can be acted upon by one or more of the content sources 132 within a time period that is relevant to the inquiry content (e.g., within a 2-5 seconds for some applications, within about a 1 second for some application, and in many implementations less than 1 second). The machine learning models are each respectively trained using one or more respective training corpora, and the respective training corpus include some, but not all, possible relevant content corresponding to that respective corpus.

In some embodiments, the intent mining system includes an enhanced input model 502 that, as described above, receives the inquiry content 202 as an input and provides the supplemental keywords 218 based an evaluation of the terms mapping information (e.g., knowledge graphs, databases, etc.). In some implementations, the terms mapping information 216 is provided by one or more mappings machine learning models 504 that evaluates historic product search information to identify threshold correlations between products. The mappings machine learning model 504 typically is trained using historic search term training corpus that includes historical relationship information between the different search terms, phrases, strings, images, etc. Further, the training may take into consideration responses to searches, such as but not limited to modifications to searches based on responses, products added to a cart (ATC), products viewed (PV), and/or other such actions. As introduced above, in some embodiments, mappings machine learning models 504 is pre-trained and pre-run in non-real-time, with results being available to the mappings machine learning models 504.

The intent mining system 102, in some embodiments, further includes a contextual embedding machine learning model 506 that uses the inquiry content 202 and/or supplemental keywords 218 to identify historic searches that are contextually relevant the inquiry content 202 and/or supplemental keywords 218. In some embodiment, the contextual embedding model 506 utilizes contextual relationship data generated by a contextual relationship machine learning model 508 that evaluates historic searches to determine contextual relevance of combinations of search terms. For example, two searches (e.g., (1) chocolate+candy canes; and (2) Chocolate & Jonny Depp) have different contextual relevance for "chocolate", where in the first instance of the term "chocolate" likely corresponds with the edible candy, while the second instance of the term "chocolate" likely corresponds with the movie entitled "Chocolate." In some embodiments, the contextual relationship model 508 is pre-run and periodically or on a schedule updated based on historic searches, and in some instances subsequent actions taken based on those searches. Further, the contextual embedding model 506 provides one or more embeddings matrices with contextually relevant embeddings (e.g., based on sentence vector) providing a contextual relationship to the inquiry content 202 and/or supplemental keywords 218.

In some embodiments, the intent mining system 102 further includes a search cluster machine learning model 510 that uses historic information 512 of searches and corresponding purchases, subsequent products adds to cart, product views, and/or other relevance factors to identify clusters or groups of search entries (e.g., search words, search phrases, search string of words, images, etc.) that resulted in similar products purchases, added to cart, etc. The clustering provides a pool or grouping of related search entries (example cluster of search entries: (a) talking baby doll toys+(b) talking toys+(c) talking dolls+(d) dolls that talk+(e) . . . ). As described above, some embodiments apply one or more filtering (e.g., window of time, season, holiday, etc.) to the historic information. Based on the engagements, correlations and/or associations between different search entries with the same or similar products purchased, the search cluster machine learning model 510 at least in part identifies relevant similar clusters of search entries.

Similarly, in some embodiments, the intent mining system 102 includes a cluster embedding machine learning model 514 that similarly 508 use the determine contextual relevance of combinations of search terms from the contextual relationship model 508 based on the historic information 512 to determine clusters of contextual relationships. Based on the clusters of search terms and the cluster of contextual relationships, a list of clusters of products 516 are identified. Typically, the search cluster model 510 and the cluster embedding model 514 are pre-trained, and repeated pre-run to improve response time and improve computation processing.

In some embodiments, for example the cluster embedding model 514 implements semantic searching, product linking, other such associations, or a combination of two or more of such associations. For example, the cluster embedding model can identify relationships of contextual embedding (e.g., embedding matrix) associated with a search entry (e.g., 800 dimensional vector), and create a similarly cluster matrix that provides similarity to the embedded matrix based on semantics and context (e.g., an intensity index or value of semantic and contextual similarity). Similarly, the cluster embedding model 514 uses product linkings that are linked based on historic purchases as a function of search entries (e.g., two search entries are not semantically similar, but are linked based on the same or similar products purchased following the respective searches (e.g., using bipartite graphs). Further, in some implementations, different types of clusters and/or embedded context clusters are produced, such as but not limited to seasonal clusters, trend clusters, holiday clusters, retail store department clusters, and other such clusters. One or more of the types of clusters may have more relevance to one or more inquiry content than the other types of clusters. Some embodiments further include one or more get clustering machine learning model 520 that uses the inquiry content, supplemental keywords 218, the determined contextual embedding to evaluate products based on the search clusters and/or contextual embedding relevance clusters to identify the listing of products 310 that are determined most relevant to the inquiry content. For example, in some implementations, the get clustering machine learning model 520 identifies one or more items in the search clusters having a threshold relationship to the input inquiry content along with the products often co-purchased with those identified one or more items in forming at least part of the listing of products that are determined particularly relevant or most relevant to the inquiry content.

As described above, the listing of products 310 is supplied to the product association system 110. In some embodiments, the products association system 110 implements a product association machine learning model 522 that accesses historic product sales information, which in some embodiments includes brick-and-mortar retail store purchase transaction data 530, e-commerce purchase transaction data 532, other sales transaction data, and typically a combination of such sales transaction data to determine associations between product sets of two or more products 536 (e.g., top product rule association) that historically have been purchased together or purchased within a threshold period of time or other such association.

Further, some embodiments evaluate the identified sets relative to the number of times and/or rates at which different sets are purchased together. In some implementations, at least part of the product association model 522 can be trained and run in non-real time and periodically updated or updated based on a schedule to identify associations between product sets of two or more products. Upon receiving the listing of products 310, the product association system 110 can use the listing of products to evaluate the previously identified sets of associated products 536, to generate the enhanced listing of products 430 that is relevant the inquiry content. Again, the enhanced listing of products 430 may be pruned based on one or more thresholds, and/or other such factors.

The above describes some machine learning models in accordance with some embodiments. One or more of these machine learning models can be implemented in an enhanced content system described above and further below. Various machine learning models are known in the art. For the sake of an illustrative example, it will be presumed here that this machine learning model comprises a neural network machine learning model, and in particular, a convolutional neural network. Each of the one or more machine learning models has been trained using a training corpus relative to the information to be evaluated by the respective model as described above and below. Further, the training corpora include some, but not all, data of interest.

As described above, one or both of the listing of products 310 and the enhanced listing of products 430 are utilized by the topic extraction systems 114. In some embodiments, the topic extraction systems 114 includes one or more topic extraction machine learning models 540 that utilizes the listing of products 310 and the enhanced listing of products 430 to identify one or more topics 550 relevant to the listing of products 310 and the enhanced listing of products 430. The one or more topic extraction models, in some applications, identifies topics based on specific products, types of products, brands of products, manufacturers of products, intend use of products, and/or other such information that enables the identification of topics relative to the inquiry content. Further, in some embodiments, one or more of the topic extraction models 540 and/or a confidence machine learning model determine the topic confidence score associated with each identified topic.

The topics are used to determine a valuation of potential enhanced contextually relevant content that is associated with a respective content source 132 and that is relevant to the inquiry content associated with the intended recipient. Based on that valuation, the content source can elect whether to take further action regarding supplying the enhanced contextually relevant content to the intended recipient.

Accordingly, in some embodiments, the topic extraction system comprises at least one topic extraction machine learning model that has been trained using a topics training corpus of product information of numerous groupings of related products and wherein the topics training corpus includes some, but not all, possible groupings of related products. The topic extraction system in identifying multiple associated topics that are estimated to be relevant to the inquiry content is configured to input the product parameters of the products of the enhanced listing of products to the at least one topic extraction machine learning model and the topic extraction machine learning model identifies the multiple associated topics that are estimated to be relevant to the inquiry content and that have an increased relevance to a sub-set of one or more of the target sources. Further, in some implementations, the topic extraction machine learning model further determines for each of the topics the respective topic confidence score.

In some embodiments, the intent mining system in obtaining a listing of products is configured to execute a get clustering machine learning model that has been trained using a clusters of search keywords training corpus wherein the cluster of search keywords training corpus includes some, but not all, possible clusters of products. The intent mining system in identify the listing of products is configured to input the inquiry content, the sub-set of supplemental keywords, and contextual embedding to the get clustering machine learning model, and items in the search clusters meeting a threshold (e.g., a top percentage, a threshold number, a threshold dependent on a number of items identified, other such threshold relationships, or a combination of two or more of such relationships) and/or having a threshold relationship to the inquiry content along with the products often co-purchased with the identified items (e.g., within a purchase threshold number of times, within a purchase threshold percentage of times, etc.) form the listing of products that are determined most relevant to the inquiry content.

Figure 6:
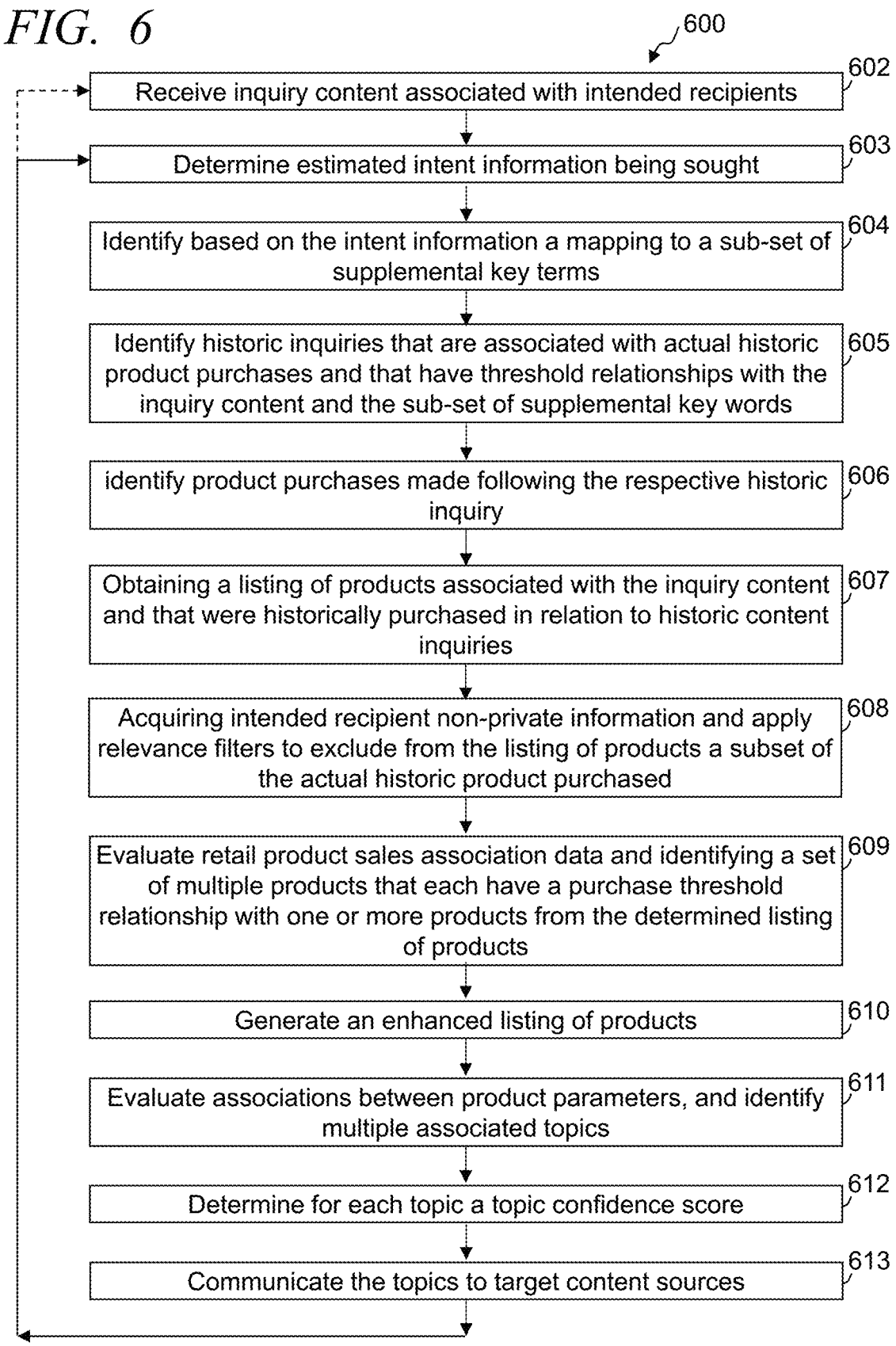
FIG. 6 illustrates a simplified flow diagram of an exemplary process of enhancing contextual information distribution, in accordance with some embodiments.

FIG. 6 illustrates a simplified flow diagram of an exemplary process 600 of enhancing contextual information distribution, in accordance with some embodiments. In step 602, multiple different inquiry content is received that are each associated with a different intended recipient of multiple different intended recipients. Typically, the inquiry content does not include personal identification information (PII) of the intended recipients and does not include personal network cookie data associated with the intended recipients. In step 603, an estimated intent information is determined for the respective intent content being sought by the respective intended recipient based on associations with the inquiry content. In step 604, a mapping to a sub-set of supplemental keywords is identified based on the intent information corresponding to the intent information and having a threshold relationship with the inquiry content. In some embodiments a terms mapping database is accessed that maps associations between terms. One or more of the sub-set of supplemental keywords associated with the intent information can be determined based on the mapping between terms in the terms mapping database.

In step 605, identifying historic inquiries that are associated with actual historic product purchases and that have threshold relationships with the inquiry content and the sub-set of supplemental keywords. The historic content inquiries typically do not include PII or personal network cookies. In step 606, product purchases made following the respective historic inquiry are identified. In step 607, a listing of products associated with the inquiry content are obtained and that were historically purchased in relation to historic content inquiries. Some embodiments include step 608, where acquiring intended recipient non-private information about the respective intended recipient as a function of a network connection and timing information corresponding to when the respective inquiry content is requested, and applying a set of relevance filters, based on the recipient non-private information and the timing information, to exclude from the listing of products a subset of the actual historic product purchased that have the association with historic inquiries In step 609, evaluating retail product sales association data and identifying a set of multiple products that each have a purchase threshold relationship with one or more products from the determined listing of products. In identifying the set of multiple products, some embodiments identify one or more products purchased a threshold number of times with a respective one of the associated products. In step 610, an enhanced listing of products is generated that comprises the listing of products and the set of multiple products. In step 611, associations between product parameters of the products of the enhanced listing of products are evaluated, and multiple associated topics are identified that are estimated to be relevant to the inquiry content. The identification of the topics, in some implementations, includes identifying one or more of types of products, brands of products, styles, and sources of the products. In step 612, a topic confidence score is determined for each topic. The respective topic confidence scores define an estimated relevance the respective topic is to the respective inquiry content based on levels of association between the product parameters of the enhanced listing of products.

Some embodiments include step 613 where the topics are communicated, over an external computer network, to target content sources to be used by one or more of the respective content sources in determining a valuation in supplying to the first intended recipient enhanced contextually relevant content associated with the respective content source and relevant to the inquiry content associated with the first intended recipient. The determination of the topic confidence score, in some implementations, includes determining the confidence score based on a frequency of actual purchases of products specifically associated with a respective one of the identified topics and is a product of at least one of the identify set of multiple products and the listing of products. One or more steps of the process 600 can be repeated. Typically, at least steps 603-613 are repeated for each received inquiry content associated with a respective one of the intended recipients. Still further, in some instances, the process distributes some or all of the enhanced contextually relevant content in response to receiving the enhanced contextually relevant content from one or more of the content sources.

In some embodiments the process in identifying the enhanced listing of products provides a topic extraction machine learning model 540 that has been trained using a topics training corpus of product information of numerous groupings of related products and wherein the topics training corpus includes some, but not all, possible groupings of related products. The product parameters of the products of the enhanced listing of products are inputted to the at least one topic extraction machine learning model and the topic extraction machine learning model identifies the multiple associated topics that are estimated to be relevant to the inquiry content and that have an increased relevance to a sub-set of one or more of the target sources. In some implementations, the topic extraction machine learning model further determines for each of the topics the respective topic confidence score. Some embodiments provide a get clustering machine learning model 520 that has been trained using a clusters of product training corpus wherein the cluster of products training corpus includes some, but not all, possible clusters of products. The inquiry content, the sub-set of supplemental keywords, and contextual embedding is inputted to the get clustering machine learning model, and items in the search clusters having a threshold relationship with the inquiry content along with the products co-purchased within a purchase threshold of the identified items (e.g., purchased a threshold percentage of time, purchased at least a threshold number of times, etc.) form the listing of products that are determined most relevant to the inquiry content.

As one non-limiting example, the enhanced content system 500 can be configured to operate as or with an advertising exchange system. Typically, such advertising exchange systems receive inquiry content (e.g., information about a website and/or content on the website being accessed by a user, search terms entered by the user etc.). This information, however, often does not include personal information, personal identification information (PII), personal network cookie data, browser behaviors, and other information because of privacy concerns and/or regulations. Accordingly, the advertising exchange systems are limited to just the information provided without relevance to the user. As a particular example, a user may be accessing a website about visiting a national park in New Jersey for the Fourth of July holiday, and the website may have information about camping, hiking, and other outdoor activities at one or more state parks in New Jersey. Accordingly, the advertising exchange system would receive inquiry content such as: State Parks, State Park Names, camping, outdoors, New Jersey, July $4^{th}$.

Often, such advertising exchanges contract with one or more direct advertisers at predefined rates. As such, in response to receiving the limited information from the website, the advertising exchange system may select advertising content from a content source, such as an outdoor equipment outfitter company (e.g., REI™) to be supplied to the website for display to the user. Additionally or alternatively, the advertising exchange system may invite bids from one or more additional secondary content sources, which are restricted to the limited information from the website in determining a value of having their content displayed on the website (e.g., based on the limited information a particular soft drink company, a barbeque company and a chicken supplier may present bids to present their relevant content).

Alternatively, the enhanced content system 500 is able to evaluate the inquiry content and provide additional relevance to that inquiry content based on the enhanced supplemental words, the determined clusters of search entries and corresponding clusters of contextual relevance, the access to millions of historic sales transaction information from one or more retail entities that is processed based on the inquiry content, supplemental key terms, determined clusters of search entries and corresponding clusters of contextual relevance, to identify relevant products that were actually purchased in relation to corresponding historic inquiry content. In part, the use of actual sales of tens of thousands and typically tens to hundreds of millions of transactions, and the identification of products actually purchased, without the use of PII and other personal network cookie information, in relation to not just the inquiry content but the enhanced inquiry content determined based at least in part on the supplemental keywords and clustering, the enhanced content system 500 is able to identify products with a high degree of reliability that these identified products are product of particular relevance to the particular inquiry content. Still further, the enhanced content system 500 further enhances the relevance to more potential content sources by not limiting the relevance information to particular products, but instead evaluating those products, their attributes, their associations and the like to identify relevant topics that are particularly relevant to those identified product while particularly relevant to the inquiry content. Additionally, in some embodiments, the enhanced content system 500 further provides the topic confidence scores associated with the identified topics.

Accordingly, the advertising exchange system is able to use that identified topics that provides a broader spectrum of relevance than the limited inquiry content to consider a broader scope of potential content sources with the additional benefit that content from this broader spectrum of potential content sources is of particular relevance to the user viewing the website. Still further, the advertising exchange system can utilize the corresponding topic confidence scores in considering the broader scope of potential content sources in identifying one or more content sources of more relevance to this particular user (based on actual historic purchases by similar users). Still further, the advertising exchange system can provide some or all of the identified topics the corresponding topic confidence scores to potential secondary content sources for use by the potential secondary content sources in evaluating the value to the respective content sources in having their respective content (e.g., adverting) presented to this particular user, again with the benefit of knowing that such the topics and topic confidence scores are based on actual historic purchases. This allows the potential secondary content sources to bid with more confidence that their advertising is of particular relevance to this user.

Figure 7:
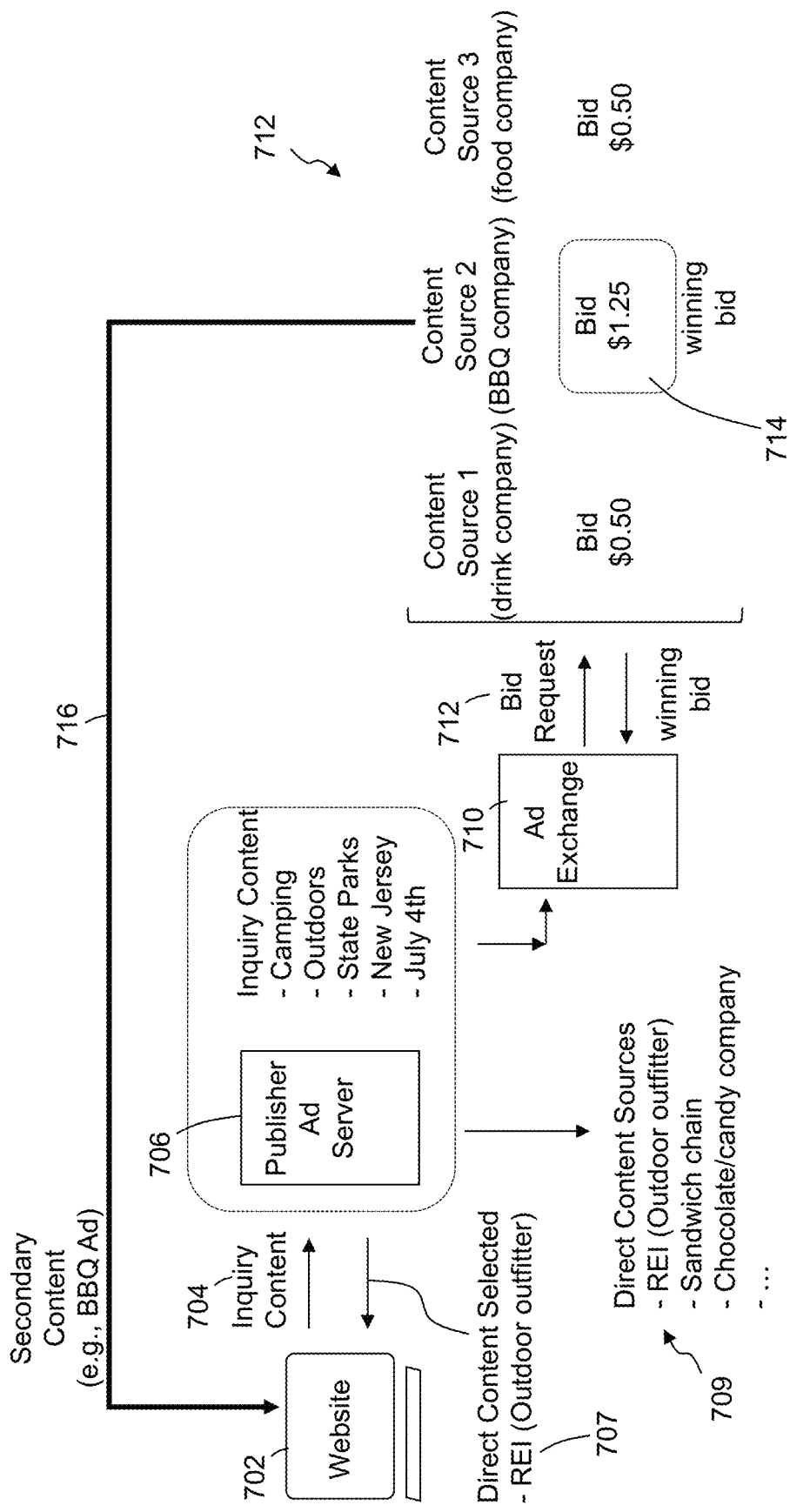
FIG. 7 illustrates an example of a previous process of identifying advertising content based on limited inquiry content.

As a further non-limiting example, FIG. 7 illustrates an example of a previous process by an advertising exchange of identifying advertising content based on limited inquiry content. A user accesses original content 702 (e.g., a website about state parks in New Jersey on July $4^{th}$). The inquiry content 704 is provided by the website to an advertising publisher 706 that uses the inquiry content to, in this example, select content 707 from a direct content source (e.g., an outdoor outfitter, such as REI™) of the potential direct content sources 709. Similarly, the inquiry content can be used by an advertising exchange 710 to request bids 712 from secondary content sources 712 (e.g., a drink company (e.g., COCA-COLA™, PEPSI™, etc.) a BBQ manufacturer (e.g., WEBER™), a chicken company (e.g., TYSONS™), etc.). These secondary content sources 712 can use the inquiry content to determine a valuation of having their advertising presented to the particular user through this website 702. Based on that determined valuation the secondary content source can determine whether or not to bid to have their advertising presented, and how much they are willing to pay. The winning bid 714 (e.g., the BBQ company at $1.25) is identified and the respective advertising for that winning secondary content source 716.

Again, however, the inquiry content typically is generic content, and often does not include content that is relevant to the user (e.g., based on privacy restrictions, settings, policies, etc.). As such, the selection of the direct content (and/or direct content source) and the bidding by the secondary content sources likely has limited if any benefit to the user and often has limited or no value to the content sources.

Figure 8:
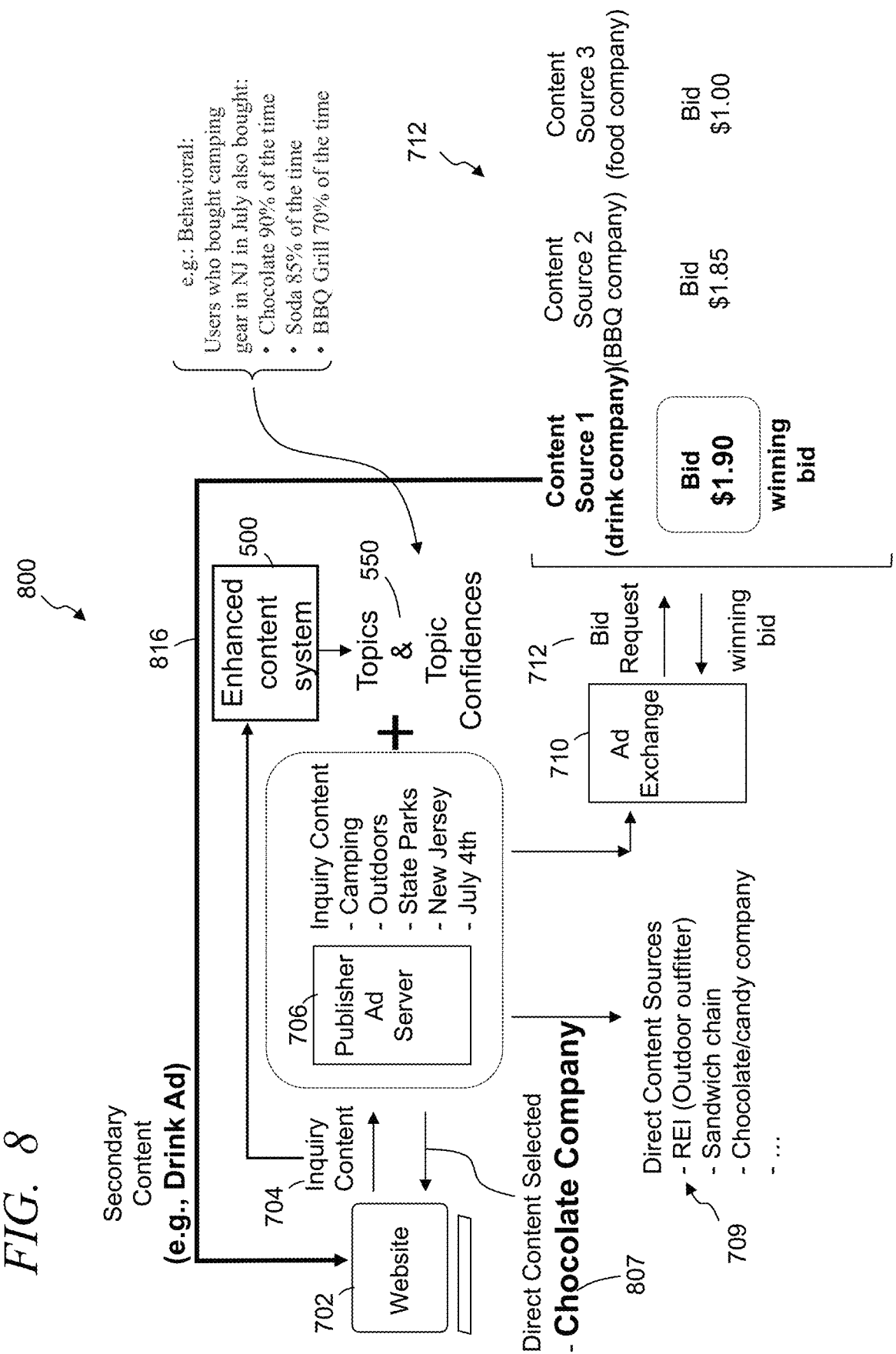
FIG. 8 illustrates an exemplary process of enhancing contextual information distribution, in accordance with some embodiments.

Alternatively, FIG. 8 illustrates an exemplary process 800 of enhancing contextual information distribution, in accordance with some embodiments. Again, a user accesses original content 702 (e.g., a website about state parks in New Jersey on July 4th). The inquiry content 704 is provided by the website to an advertising publisher 706. Additionally, the inquiry content 704 is provided to the enhanced content system 500, which can be operated by the publisher 706, ad exchange 710, or operated by a separate service (e.g., through one or more servers accessible by the publisher and/or the ad exchange). The enhanced content system 500 takes advantage of the hundreds of thousands (and typically tens to hundreds of millions) of retail sales transactions and/or electronic shopping experiences, to enhance the inquiry content with the supplemental keywords, identify products (in some embodiments based on clustering as described above) actually purchased and highly relevant to the inquiry content, use those identified products to identify an expanded listing of products through product association, and evaluate that expanded listing of products to determine topics 550 relevant to the inquiry content, and in some instances confidence scores, which typically indicate a level of confidence that the topic directly relates to the inquiry content. For example, based on the inquiry content 704, the enhanced content system 500 may identify camping gear as a topic with a high level of relevance (based on users that actually purchased camping gear in NJ in July), and further identify the same users also purchased (1) chocolate 90% of the time they purchased camping gear or within a threshold period of time of purchasing the camping gear, (2) soda 85% of the time, (3) BBQ Grill 70% of the time, etc.

The advertising publisher 706 can then utilize not just the inquiry content but the topics and confidence scores to more effectively evaluate potential direct content sources 709 and select more relevant content 707 from a content source 709. In expanding on the above example, the enhanced content system 500, the publisher, the ad exchange, the content sources and/or other relevant entities may identify, based on the actual historic purchases, that the topics with a high degree of confidence that corresponds to actual purchases, more relevant content for the intended recipient (e.g., chocolate and soda may be more relevant than BBQ grills). For example, the advertising publisher may select advertising of chocolate content 807 from a chocolate company content source (e.g., HERSHEY™) as the direct content. Similarly, the ad exchange 710 can make the topics and topic confidence scores available to the secondary content sources 712 enabling the secondary content sources to more effectively determine a valuation of having their content presented to the user, while that secondary content is a more enhanced contextually relevant content for the particular user. For example, based on the topics (e.g., soda purchased 85% of the time), a drink company (e.g., COCA-COLA™) may present a winning bid 816 at a higher value (e.g., $1.90) than otherwise with the added knowledge of the relevance of actual purchases of soda. Similarly, secondary content sources may bid at higher levels (e.g., $1.85 instead of $1.25, and $1.00 instead of $0.50) with the added confidence that their content is more enhanced contextually relevant content for the particular user. Similarly, content sources may identify that their content is not as relevant for this user as they might have otherwise anticipated based on the topics and confidence scores. Accordingly, the enhanced content system 500 enables more enhanced contextually relevant content to be provided to an intended recipient, while enabling content sources to more effectively evaluate a valuation of providing content to an intended recipient.

It is noted again that the above is one simple example of the utilization of the enhanced content system 500. Advertising content is only one type of content that can take advantage of the topics and topic confidences in evaluating content and valuation in making content available to users. Other examples of relevant content include, but are not limited to, social media content, news content, entertainment content, scientific content, educational content, manufacturing content, shipping content, distribution content, and other content. The above listing is merely an example and should not be considered a complete or exhaustive listing of possible types of content and/or content sources.

Figure 9:
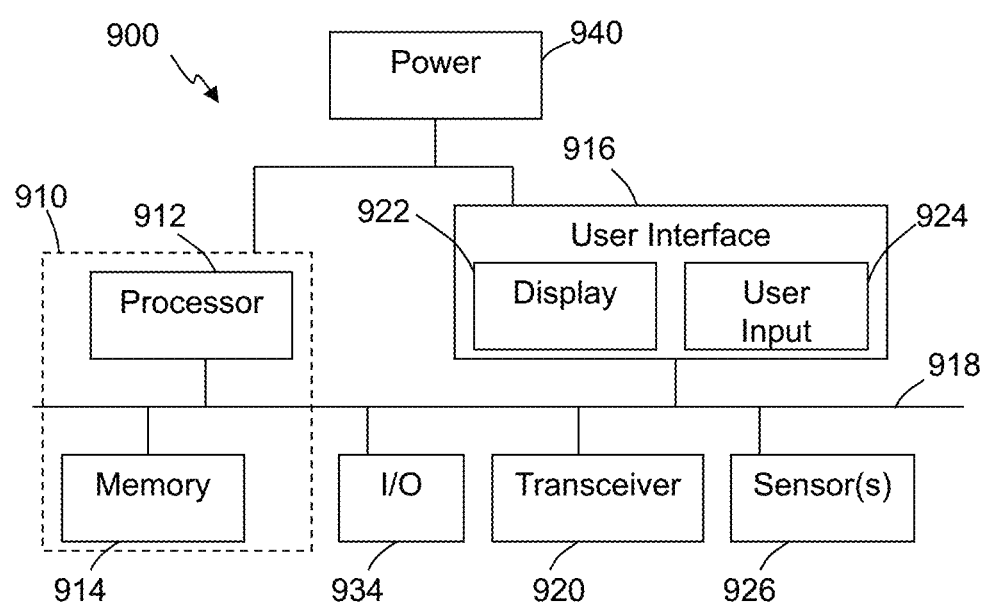
FIG. 9 illustrates an exemplary system for use in implementing systems, methods, techniques, devices, apparatuses, servers, sources and providing contextual intelligent information in accordance with some embodiments.

Further, the circuits, circuitry, systems, devices, processes, methods, techniques, functionality, services, servers, sources and the like described herein may be utilized, implemented and/or run on many different types of devices and/or systems. FIG. 9 illustrates an exemplary system 900 that may be used for implementing any of the systems, components, circuits, circuitry, functionality, apparatuses, processes, or devices of the enhanced content system 100, enhanced content system 500, the intent mining systems 102, the product association systems 110, the topic extraction systems 114, the distribution systems 120, the entity interface systems 130, and/or other above or below mentioned systems or devices, or parts of such circuits, circuitry, functionality, systems, apparatuses, processes, or devices. However, the use of the system 900 or any portion thereof is certainly not required.

By way of example, the system 900 may comprise a control circuit or processor module 912, memory 914, and one or more communication links, paths, buses or the like 918. Some embodiments may include one or more user interfaces 916, and/or one or more internal and/or external power sources or supplies 940. The control circuit 912 can be implemented through one or more processors, microprocessors, central processing unit, logic, local digital storage, firmware, software, and/or other control hardware and/or software, and may be used to execute or assist in executing the steps of the processes, methods, functionality and techniques described herein, and control various communications, decisions, programs, content, listings, services, interfaces, logging, reporting, etc. Further, in some embodiments, the control circuit 912 can be part of control circuitry and/or a control system 910, which may be implemented through one or more processors with access to one or more memory 914 that can store instructions, code and the like that is implemented by the control circuit and/or processors to implement intended functionality. In some applications, the control circuit and/or memory may be distributed over a communications network (e.g., LAN, WAN, Internet) providing distributed and/or redundant processing and functionality. Again, the system 900 may be used to implement one or more of the above or below, or parts of, components, circuits, systems, processes and the like. For example, the system may implement the intent mining system 102 with the control circuit being an intent mining control circuit implemented through one or more of the mining processors 104, the product association system 110 with the control circuit being an product association control circuit implemented through one or more of the product association processors 112, the topic extraction system 114 with the control circuit being an topic extraction control circuit implemented through one or more of the topic extraction processors 116, and/or other components.

The user interface 916 can allow a user to interact with the system 900 and receive information through the system. In some instances, the user interface 916 includes a display 922 and/or one or more user inputs 924, such as buttons, touch screen, track ball, keyboard, mouse, etc., which can be part of or wired or wirelessly coupled with the system 900. Typically, the system 900 further includes one or more communication interfaces, ports, transceivers 920 and the like allowing the system 900 to communicate over a communication bus, a distributed computer and/or communication network 106 (e.g., a local area network (LAN), the Internet, wide area network (WAN), etc.), communication link 918, other networks or communication channels with other devices and/or other such communications or combination of two or more of such communication methods. Further the transceiver 920 can be configured for wired, wireless, optical, fiber optical cable, satellite, or other such communication configurations or combinations of two or more of such communications. Some embodiments include one or more input/output (I/O) ports 934 that allow one or more devices to couple with the system 900. The I/O ports can be substantially any relevant port or combinations of ports, such as but not limited to USB, Ethernet, or other such ports. The I/O interface 934 can be configured to allow wired and/or wireless communication coupling to external components. For example, the I/O interface can provide wired communication and/or wireless communication (e.g., Wi-Fi, Bluetooth, cellular, RF, and/or other such wireless communication), and in some instances may include any known wired and/or wireless interfacing device, circuit and/or connecting device, such as but not limited to one or more transmitters, receivers, transceivers, or combination of two or more of such devices.

In some embodiments, the system may include one or more sensors 926 to provide information to the system and/or sensor information that is communicated to another component, such as a central control system, a content source, a web server, etc. The sensors can include substantially any relevant sensor, such as optical-based scanning sensors to sense and read optical patterns (e.g., bar codes), camera and/or image capture systems, radio frequency identification (RFID) tag reader sensors capable of reading RFID tags in proximity to the sensor, and other such sensors. For example, one or more sensors may be used to capture product information that can be used as the inquiry content or as part of the inquiry content (e.g., user using their portable user device (e.g., smartphone, tablet, etc.), a kiosk having the sensor(s), and/or other such systems). The foregoing examples are intended to be illustrative and are not intended to convey an exhaustive listing of all possible sensors. Instead, it will be understood that these teachings will accommodate sensing any of a wide variety of circumstances in a given application setting.

The system 900 comprises an example of a control and/or processor-based system with the control circuit 912. Again, the control circuit 912 can be implemented through one or more processors, controllers, central processing units, logic, software and the like. Further, in some implementations the control circuit 912 may provide multiprocessor functionality.

The memory 914, which can be accessed by the control circuit 912, typically includes one or more processor-readable and/or computer-readable media accessed by at least the control circuit 912, and can include volatile and/or nonvolatile media, such as RAM, ROM, EEPROM, flash memory and/or other memory technology. Further, the memory 914 is shown as internal to the control system 910; however, the memory 914 can be internal, external or a combination of internal and external memory. Similarly, some or all of the memory 914 can be internal, external or a combination of internal and external memory of the control circuit 912. The external memory can be substantially any relevant memory such as, but not limited to, solid-state storage devices or drives, hard drive, one or more of universal serial bus (USB) stick or drive, flash memory secure digital (SD) card, other memory cards, and other such memory or combinations of two or more of such memory, and some or all of the memory may be distributed at multiple locations over the computer network 106. The memory 914 can store code, software, executables, scripts, data, content, lists, programming, programs, log or history data, user information, customer information, product information, and the like. While FIG. 9 illustrates the various components being coupled together via a bus, it is understood that the various components may actually be coupled to the control circuit and/or one or more other components directly.

In some embodiments, systems provide contextual information configured to be used in identifying enhanced, contextually relevant content. Some embodiments comprise: an intent mining system comprising mining evaluation processors communicatively coupled over a distributed communication network and configured to receive inquiry content associated with different intended recipients and that does not include personal identification information (PII) of the intended recipients and does not include personal network cookie data associated with the intended recipients, and for each inquiry content associated with a respective one of the intended recipients the mining evaluation processors are configured to: determine an estimated intent information being sought by the respective intended recipient based on associations with the inquiry content, and identify based on the intent information a mapping to a sub-set of supplemental keywords corresponding to the intent information and having a threshold relationship with the inquiry content; and identify historic inquiries that are associated with actual historic product purchases and that have threshold relationships with the inquiry content and the sub-set of supplemental keywords, wherein the historic content inquiries do not include PII or personal network cookies, and identify product purchases made following the respective historic inquiry, and obtain a listing of products associated with the inquiry content and that were historically purchased in relation to historic content inquiries; a product association system comprising one or more association processors configured to, for each inquiry content: evaluate retail product association data and identify a set of multiple products that each have a purchase threshold relationship with one or more products from the determined listing of products, and generate an enhanced listing of products comprising the listing of products and the set of multiple products; a topic extraction system comprising one or more topic extraction processors configured to: evaluate associations between product parameters of the products of the enhanced listing of products to identify multiple associated topics that are estimated to be relevant to the inquiry content, and determine for each topic a topic confidence score defining an estimated relevance the respective topic has to the respective inquiry content based on levels of association between the product parameters of the enhanced listing of products; and a distribution system comprising one or more distribution processors configured to: communicate, over an external computer network, the topics to target content sources to be used by one or more of the respective content sources in determining a valuation in supplying to the first intended recipient enhanced contextually relevant content associated with the respective content source and relevant to the inquiry content associated with the first intended recipient.

Some embodiments provide methods providing contextual information comprising: receiving multiple different inquiry content that are each associated with different intended recipients, wherein the inquiry content does not include personal identification information (PII) of the intended recipients and does not include personal network cookie data associated with the intended recipients, and for each inquiry content associated with a respective one of the intended recipients: determining an estimated intent information being sought by the respective intended recipient based on associations with the inquiry content, identifying based on the intent information a mapping to a sub-set of supplemental keywords corresponding to the intent information and having a threshold relationship with the inquiry content; and identifying historic inquiries that are associated with actual historic product purchases and that have threshold relationships with the inquiry content and the sub-set of supplemental keywords, wherein the historic content inquiries do not include PII or personal network cookies, and identify product purchases made following the respective historic inquiry; obtaining a listing of products associated with the inquiry content and that were historically purchased in relation to historic content inquiries; evaluating retail product sales association data and identifying a set of multiple products that each have a purchase threshold relationship with one or more products from the determined listing of products; generating an enhanced listing of products comprising the listing of products and the set of multiple products; evaluating associations between product parameters of the products of the enhanced listing of products; identifying multiple associated topics that are estimated to be relevant to the inquiry content; and determining for each topic a topic confidence score defining an estimated relevance the respective topic is to the respective inquiry content based on levels of association between the product parameters of the enhanced listing of products; and communicating, over an external computer network, the topics to target content sources to be used by one or more of the respective content sources in determining a valuation in supplying to the first intended recipient enhanced contextually relevant content associated with the respective content source and relevant to the inquiry content associated with the first intended recipient.

Previous systems that identify and/or provide targeted content to intended recipients are based on collecting and analyzing users' browsing behaviors, PII, first party information and other such information, which can provide insights into users' perceived behaviors, habits and expected actions (e.g., buying behaviors). With the deprecation of availability and/or allowed use of third-party cookies, limitations on the availability of metadata, restrictions on the availability of mobile device IDs, the number of persistent information and/or signals available for the evaluation of content sources, relevance of content to an intended recipient and/or valuation of content relative to a potential intended recipient decreases. Further, such information is often not available or not used as industries and/or content sources move towards privacy-centric implementation. Unlike cookies and device identifiers, contextual signals by themselves generally cannot uniquely identify individuals or signal their past purchase and browsing patterns.

The enhanced content system 500 in part implements a user intent mining in real time to map available content signals from potential content sources to historic browse patterns relative to actual product purchases, and extract an initial set or listing of products 310 that are directly relevant to the inquiry content. Further, some embodiments in performing the intent mining further supplement the inquiry content, at least in part, based on threshold relationships with historic evaluations of terms mapping information (e.g., knowledge graphs, databases, etc.). This listing of products, in some implementations, is further enhanced by identifying a more exhaustive layer of products relevant to the inquiry content using historic, actual cross-product purchase propensities in omni transactions that corresponds to the listing of products. For example, some embodiments not only use product information, but further use data that map context to retail browsing signals, and map and/or provide associations between such browsing signals to products. Further, such products can be used to identify cross-buy propensities across products based on extensive actual historic purchase data. Such extensive, actual historic purchase data is typically not available to other search systems. Similarly, such actual historic purchase data typically more accurately predicts future actions because of the relationship to actions that previous users actually preformed. Still further, some embodiments adjust for extraneous factors such as season, geography, user browsing signals (when available), and the like.

The resultant enhanced listing of products 430 provides a robust product space that is evaluated in real-time to enhance the relevance beyond the specifically identified enhanced listing of such products through the identify topics 550 can potentially be utilized in evaluating potential content that can be supplied to the intended recipient, used by content sources in determining a valuation of supplying content to an intended recipient and other such advantages. This enables the identification of content that is more relevant to the intended recipient while complying with privacy restrictions. Further, the enhanced ability to identify more relevant content and/or the evaluation of a value of supplying content significantly improves, as non-limiting examples, ad-serving, and sponsored content supply processes by accurately indicating purchase intent and increasing advertising effectiveness.

Some embodiments provide enhanced contextual content personalization with a new class of real-time point of sale and/or other such omni signals based on actual retail data (e.g., historic search data, historic actual sales, correlations between historic search data and historic actual sales, and/or other such information) to enhance the identification of content that is more contextually relevant to an intended recipient that is thus more valuable not only to the intended recipient but also to the content source and other entities (e.g., retail entities, service providers, etc.). Content relevant topics signals, in some embodiments, are delivered (e.g., via an API service) that meet content provides response time requirements (e.g., often less than 1 second, and typically less than hundreds of milliseconds).

Further, as described above, some embodiments utilize machine learning model artificial intelligence to generate cross-product propensity to buy signals based on historic purchase history data and virtual shopping basket analysis that provides enhanced applications in ecommerce by in part generating content relevant topics that can be used for example in identifying content relevant content and recommendations and search capabilities within brand websites, customer relationship management (CRM) for example through personalized marketing (e.g., email marketing, direct mail marketing, access to third party content, etc.), supply chain management and control based in part on demand forecasting, assortment planning, and the like, promotions and/or sales in part through the bundling of products, packaging, promotional offers and the like, other such enhanced applications.

The enhanced content systems and/or generation of relevant topics has broad-scale commercialization of, at least, cross-product buyer propensity data using retail data that can be used in the identification of relevant content to a particular intended recipient (e.g., for the news industry, social media industry, ad-tech industry, entertainment industry, and other such content sources). Some embodiments take advantage of the large, widespread scale retail data in terms of at least customer base, store locations, and product range that most other entities and/or industries do not have. Again, many restrictions are being and/or expected to be implemented regarding access to and/or use of PII, network cookies and/or such information, and industries are shifting towards privacy centric targeting solutions in identifying relevant content. Accordingly, the enhanced content system provides significant value as it augments targeting signals with actual buyer behavior data without revealing PII and/or other such restricted information.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

The invention claimed is:
1. A system providing contextual information comprising:
an intent mining system comprising a mining evaluation processor configured to receive inquiry content associated with an intended recipient and that does not include personal identification information (PII) or personal network cookie data, wherein the mining evaluation processor is configured to:
   determine a set of supplemental keywords corresponding to intent information corresponding to the inquiry content; and
   identify historic inquiries each having a threshold relationship with the set of supplemental keywords and obtain a listing of products corresponding to the historic inquiries;
a product association system comprising one or more association processors configured to, for each of the inquiry content: identify a set of multiple products that each have a purchase threshold relationship with one or more products from the listing of products, and generate an enhanced listing of products comprising the listing of products and the set of multiple products;
a topic extraction machine learning model is applied to product parameters of the products of the enhanced listing of products and to identify, based on the product parameters, multiple associated topics wherein the topic extraction machine learning model is trained using a topics training corpus of product information and wherein the topic extraction machine learning model is retrained over time based on responses to previous inquiries by previous recipients; and a distribution system configured to: communicate the identified multiple associated topics to one or more target content sources.

2. The system of claim 1, wherein the mining evaluation processor is configured to determine the set of supplemental keywords associated with the intent information based on a mapping between terms.

3. The system of claim 1, wherein the mining evaluation processor is further configured to acquire intended recipient non-private information about the intended recipient as a function of a network connection and timing information corresponding to when the respective inquiry content is requested; and apply a set of relevance filters, based on the recipient non-private information and the timing information, to exclude from the listing of products a subset of actual historic products purchased that have the association with historic inquiries.

4. The system of claim 1, wherein the one or more association processors, in identifying the set of multiple products, identifies one or more products purchased a threshold number of times with a respective one of the set of multiple products.

5. The system of claim 1, further comprising:
a topic extraction system comprising a topic extraction processor executing instructions to provide for each topic, of the multiple associated topics, a topic confidence score defining an estimated relevance the respective topic has to the respective inquiry content based on levels of association between the product parameters of the enhanced listing of products and on a frequency of actual purchases of products specifically associated with a respective one of the identified multiple associated topics and is a product of at least one of the identified set of multiple products and the listing of products.

6. The system of claim 5, wherein the identified multiple associated topics comprise one or more types of products, brands of products, styles, and sources of the products.

7. The system of claim 1, wherein the topics training corpus of product information comprises product information of numerous groupings of related products; and
wherein the identified multiple associated topics are estimated to be relevant to the inquiry content and that have an increased relevance to a sub-set of the one or more target content sources.

8. The system of claim 7, wherein the topic extraction machine learning model further provides for each of the topics, of the multiple associated topics, a respective topic confidence score.

9. The system of claim 1, wherein the intent mining system in obtaining the listing of products is configured to execute a get clustering machine learning model trained using clusters of search keywords training corpus; and
wherein the intent mining system in identifying the listing of products is configured to input the inquiry content, the set of supplemental keywords, and contextual embedding to the get clustering machine learning model, and items in search clusters having a threshold relationship to the inquiry content along with products co-purchased within a purchase threshold of the identified items form at least part of the listing of products that are determined most relevant to the inquiry content.

10. The system of claim 1, wherein the distribution system in communicating the multiple associated topics is configured to communicate the multiple associated topics to the one or more target content sources configured to be utilized in determining a valuation in supplying to a first intended recipient enhanced contextually relevant content associated with a respective one of the one or more target content sources and relevant to the inquiry content associated with the first intended recipient.

11. A method providing contextual information comprising:
receiving inquiry content associated with an intended recipient, wherein the inquiry content does not include personal identification information (PII) or personal network cookie data;
determining, for each inquiry content, a set of supplemental keywords corresponding to intent information corresponding to the inquiry content; and
identifying, for each inquiry content, historic inquiries each having a threshold relationship with the set of supplemental keywords;
obtaining a listing of products corresponding to the historic inquiries;
identifying a set of multiple products that each have a purchase threshold relationship with one or more products from the listing of products;
generating an enhanced listing of products comprising the listing of products and the set of multiple products;
applying a topic extraction machine learning model to product parameters of the products of the enhanced listing of products, wherein the topic extraction machine learning model is trained using a topics training corpus of product information;
retraining over time the topic extraction machine learning model based on responses to previous inquiries by previous recipients;
identifying, by the retrained topic extraction machine learning model, multiple associated topics that are estimated to be relevant to the inquiry content; and
communicating the identified multiple associated topics to one or more target content sources.

12. The method of claim 11, further comprising;
determining the set of supplemental keywords associated with the intent information based on a mapping between terms.

13. The method of claim 11, further comprising:
acquiring intended recipient non-private information about the intended recipient as a function of a network connection and timing information corresponding to when the respective inquiry content is requested; and
applying a set of relevance filters, based on the recipient non-private information and the timing information, to exclude from the listing of products a subset of actual historic products purchased that have the association with historic inquiries.

14. The method of claim 11, wherein the identifying the set of multiple products comprises identifying one or more products purchased a threshold number of times with a respective one of the set of multiple products.

15. The method of claim 11, further comprising:
providing for each topic, of the multiple associated topics, a topic confidence score defining an estimated relevance the respective topic is to the respective inquiry content based on levels of association between the product parameters of the enhanced listing of products and a frequency of actual purchases of products specifically associated with a respective one of the identified multiple associated topics and is a product of at least one of the identified set of multiple products and the listing of products.

16. The method of claim 15, wherein the identifying the multiple associated topics comprises identifying one or more types of products, brands of products, styles, and sources of the products.

17. The method of claim 15, wherein the topics training corpus of product information comprises product information numerous groupings of related products; and
  wherein the identified multiple associated topics are estimated to be relevant to the inquiry content and that have an increased relevance to a sub-set of the one or more target content sources.

18. The method of claim 17, further comprising providing for each of the topics, of the multiple associated topics, by the topic extraction machine learning model the respective topic confidence score.

19. The method of claim 11, further comprising:
  providing a get clustering machine learning model that has been trained using clusters of search keywords training corpus wherein the cluster of search keywords training corpus; and
  applying the get clustering machine learning model to the inquiry content, the set of supplemental keywords, and contextual embedding, and items in search clusters having a threshold relationship to the input inquiry content along with products co-purchased within a purchase threshold of the identified items form at least part of the listing of products that are determined most relevant to the inquiry content.

20. A non-transitory processor readable medium storing instructions for providing contextual information that, when executed, causes a control circuit to:
  receive inquiry content associated with an intended recipient, wherein the inquiry content does not include personal identification information (PII) or personal network cookie data;
  determine, for each inquiry content, a set of supplemental keywords corresponding to intent information corresponding to the inquiry content; and
  identify, for each inquiry content, historic inquiries each having a threshold relationship with the set of supplemental keywords;
  obtain a listing of products corresponding to the historic inquiries;
  identify a set of multiple products that each have a purchase threshold relationship with one or more products from the listing of products;
  generate an enhanced listing of products comprising the listing of products and the set of multiple products;
  apply a topic extraction machine learning model to product parameters of the products of the enhanced listing of products, wherein the topic extraction machine learning model is trained using a topics training corpus of product information;
  retrain over time the topic extraction machine learning model based on responses to previous inquiries by previous recipients;
  identify, by the retrained topic extraction machine learning model, multiple associated topics that are estimated to be relevant to the inquiry content; and
  communicate the multiple associated topics to one or more target content sources.

\* \* \* \* \*